(12) United States Patent
Buttazzoni et al.

(10) Patent No.: US 9,409,585 B2
(45) Date of Patent: *Aug. 9, 2016

(54) CASTOR SUPPORTED DOLLY ASSEMBLY CAPABLE OF BEING MADE FROM LIGHTWEIGHT MATERIALS AND OF BEING USED AS A PALLET ASSEMBLY

(71) Applicant: Luca Buttazzoni, Miami, FL (US)

(72) Inventors: Luca Buttazzoni, Miami, FL (US); Andres Bernal, Sunny Isles, FL (US)

(73) Assignee: Luca Buttazzoni, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/532,642

(22) Filed: Nov. 4, 2014

(65) Prior Publication Data

US 2015/0353113 A1  Dec. 10, 2015

Related U.S. Application Data

(63) Continuation-in-part of application No. 14/156,753, filed on Jan. 16, 2014, now Pat. No. 8,876,127, which is a continuation of application No. 13/942,206, filed on Jul. 15, 2013, now Pat. No. 8,876,145.

(51) Int. Cl.
*B62B 3/02* (2006.01)
*B62B 5/00* (2006.01)

(52) U.S. Cl.
CPC ............... *B62B 3/02* (2013.01); *B62B 5/0093* (2013.01); *B62B 2205/006* (2013.01); *B62B 2301/252* (2013.01)

(58) Field of Classification Search
CPC ............. B62B 1/00; B62B 3/04; B62B 1/10; B62B 5/0093

USPC ................ 280/79.11, 638, 79.2, 79.5, 47.11, 280/47.371, 47.34

See application file for complete search history.

(56) References Cited

U.S. PATENT DOCUMENTS

| 123,147 | A | 1/1872 | Blackman |
| 189,531 | A | 4/1877 | Voorhees |
| 208,650 | A | 10/1878 | Tucker |
| 217,172 | A | 7/1879 | Tucker |
| RE9,283 | E | 7/1880 | Woodruff |
| 357,406 | A | 2/1887 | Nelms |

(Continued)

FOREIGN PATENT DOCUMENTS

| GB | 2423012 | 8/2006 |
| JP | 6293201 | 10/1994 |

*Primary Examiner* — Hau Phan
(74) *Attorney, Agent, or Firm* — Malloy & Malloy, P.L.

(57) ABSTRACT

A castor supported dolly assembly, but also a dolly assembly that can be used either with or without castors so as to provide a new pallet assembly. The dolly assembly comprises a plurality of dolly members formed of a lightweight, disposable and/or severable material may be interconnected into interchangeable operative positions to define supporting orientations. Each dolly member includes and at least one connecting segment comprising a slot and a base. A connected orientation, of any two of the dolly members, comprises a confronting relation of the bases of engaging connecting segments and an aligned orientation of corresponding passages formed therein, so as to concurrently allow a castor to be removably received and retained in interconnecting relation to the confronting bases. Each dolly member may also include at least one supporting segment structured to receive a castor therein.

7 Claims, 19 Drawing Sheets

(56) References Cited

U.S. PATENT DOCUMENTS

| | | |
|---|---|---|
| 375,406 A | 12/1887 | Wilson et al. |
| 378,135 A | 2/1888 | Hess |
| 442,825 A | 12/1890 | Randall |
| 444,020 A | 1/1891 | Rogers et al. |
| 511,793 A | 1/1894 | Philion |
| 520,319 A | 5/1894 | Kynoch |
| 525,298 A | 8/1894 | Thiele et al. |
| 600,172 A | 3/1898 | Rechtsteiner |
| 843,234 A | 2/1907 | Rawlinson |
| 970,386 A | 9/1910 | Nickerson |
| 1,265,850 A | 5/1918 | Wierszewska |
| 1,364,423 A | 1/1921 | Brown |
| 1,461,027 A | 7/1923 | Brockson |
| 1,508,232 A | 9/1924 | Milosy |
| 1,887,067 A | 11/1932 | Pehrsson |
| 1,891,393 A | 12/1932 | Oppenlander |
| 1,918,604 A | 7/1933 | Johnson |
| 1,942,112 A | 1/1934 | McQuilkin |
| 2,048,608 A | 7/1936 | Holland |
| 2,186,368 A | 1/1940 | Conger |
| 2,423,711 A | 7/1947 | Knox |
| 2,490,879 A | 12/1949 | Milich |
| 2,500,215 A | 3/1950 | Swearingen |
| 2,534,367 A | 12/1950 | Fernotta et al. |
| 2,575,189 A | 11/1951 | Schmidt |
| 2,654,421 A | 10/1953 | Neff |
| 2,661,220 A | 12/1953 | Davis |
| D177,208 S | 3/1956 | Berlin |
| 2,830,824 A | 4/1958 | Young |
| 2,849,241 A | 8/1958 | Owen |
| 3,007,710 A | 11/1961 | Sykes |
| 3,202,438 A | 8/1965 | Panknin et al. |
| 3,285,447 A | 11/1966 | Junion |
| 3,294,041 A | 12/1966 | Lessheim |
| 3,329,442 A | 7/1967 | Di Vietri |
| 3,367,675 A | 2/1968 | Gearin |
| 3,380,404 A | 4/1968 | Shell |
| 3,389,421 A | 6/1968 | Wheeler |
| 3,522,951 A | 8/1970 | Tyson |
| 3,552,761 A | 1/1971 | Sjoblom |
| 3,559,802 A | 2/1971 | Eidus |
| 3,577,620 A | 5/1971 | Hoffman et al. |
| 3,802,717 A | 4/1974 | Eitreim |
| 3,831,959 A | 8/1974 | Fontana |
| 3,871,676 A | 3/1975 | Renard et al. |
| 3,923,318 A | 12/1975 | Renard et al. |
| 3,963,256 A | 6/1976 | Stafford |
| 3,964,762 A | 6/1976 | Adams |
| 3,983,821 A | 10/1976 | Kearns |
| 4,023,816 A | 5/1977 | Ellman et al. |
| 4,059,057 A | 11/1977 | Carnwath |
| 4,178,006 A | 12/1979 | Johnson |
| 4,274,644 A | 6/1981 | Taylor |
| 4,285,550 A | 8/1981 | Blackburn et al. |
| 4,381,054 A | 4/1983 | Rumpel |
| 4,382,637 A | 5/1983 | Blackburn et al. |
| 4,392,665 A | 7/1983 | Miller et al. |
| 4,402,506 A | 9/1983 | Jones |
| 4,540,196 A | 9/1985 | Paping et al. |
| 4,576,389 A | 3/1986 | Villaveces et al. |
| 4,647,056 A | 3/1987 | Baker |
| 4,694,962 A | 9/1987 | Taub |
| 4,720,115 A | 1/1988 | Rehrig |
| 4,725,028 A | 2/1988 | Conradt |
| 4,743,039 A | 5/1988 | Ellis |
| D298,077 S | 10/1988 | Goodwin |
| 4,778,041 A | 10/1988 | Blaurock |
| 4,799,288 A | 1/1989 | Kimizawa |
| 4,824,129 A | 4/1989 | Rehrig |
| 4,841,880 A | 6/1989 | Ferguson |
| 4,969,657 A | 11/1990 | Kaufmann |
| 4,972,782 A | 11/1990 | Shepherd et al. |
| 4,996,738 A | 3/1991 | Tifre |
| 5,033,758 A | 7/1991 | Levy |
| 5,040,809 A | 8/1991 | Yang |
| 5,123,665 A | 6/1992 | Levy |
| 5,144,708 A | 9/1992 | Pekar |
| 5,219,058 A | 6/1993 | Sundseth |
| 5,230,408 A | 7/1993 | Sadow |
| D338,560 S | 8/1993 | Lundy |
| 5,299,817 A | 4/1994 | Chang |
| 5,318,312 A | 6/1994 | Montemayor |
| 5,379,485 A | 1/1995 | Oshins et al. |
| 5,393,079 A | 2/1995 | Wang |
| 5,564,143 A | 10/1996 | Pekar et al. |
| 5,599,031 A | 2/1997 | Hodges |
| 5,601,035 A | 2/1997 | Herring et al. |
| 5,726,368 A | 3/1998 | Shaw |
| 5,737,801 A | 4/1998 | Flood |
| 5,803,471 A | 9/1998 | DeMars et al. |
| 5,820,142 A | 10/1998 | Duer |
| 5,829,765 A | 11/1998 | Snider |
| D412,609 S | 8/1999 | Karp et al. |
| 6,038,734 A | 3/2000 | Facchin |
| 6,039,327 A | 3/2000 | Spector |
| D426,929 S | 6/2000 | Karp et al. |
| 6,095,533 A | 8/2000 | Balolia |
| 6,095,534 A | 8/2000 | Wong |
| 6,134,747 A | 10/2000 | Leibman |
| 6,179,374 B1 | 1/2001 | Tang |
| 6,354,619 B1 | 3/2002 | Kim |
| 6,371,496 B1 | 4/2002 | Balolia |
| 6,382,643 B1 | 5/2002 | Baker |
| 6,419,198 B1 | 7/2002 | Einav |
| 6,491,318 B1 | 12/2002 | Galt et al. |
| 6,772,478 B2 | 8/2004 | Herder et al. |
| 6,776,382 B1 | 8/2004 | Papadopoulos et al. |
| 6,877,622 B2 | 4/2005 | Tsai |
| 6,923,466 B2 | 8/2005 | Tsai |
| 6,942,605 B1 | 9/2005 | Sukhovitsky |
| 6,955,368 B2 | 10/2005 | Bakhoum |
| 6,964,423 B1 | 11/2005 | Chieh et al. |
| 7,036,161 B2 | 5/2006 | Harrison et al. |
| 7,055,847 B2 | 6/2006 | Miller et al. |
| 7,188,859 B2 | 3/2007 | Hardin et al. |
| 7,305,737 B2 | 12/2007 | Libakken |
| 7,360,783 B2 | 4/2008 | Home |
| 7,374,186 B2 | 5/2008 | Mason et al. |
| 7,421,956 B1 | 9/2008 | McCarthy et al. |
| 7,441,786 B2 | 10/2008 | Stryker et al. |
| 7,478,835 B2 | 1/2009 | Autenrieth |
| 7,543,539 B2 | 6/2009 | Miller |
| 7,547,037 B2 | 6/2009 | Poppinga et al. |
| 7,555,879 B1 | 7/2009 | Utz et al. |
| 7,621,858 B2 | 11/2009 | Sheron |
| 8,011,686 B2 | 9/2011 | Chen et al. |
| 8,025,299 B2 | 9/2011 | Hiltz |
| 8,096,566 B2 | 1/2012 | West |
| 8,205,841 B2 | 6/2012 | Wood |
| 8,220,824 B2 | 7/2012 | Chen et al. |
| 8,403,344 B2 | 3/2013 | Carver et al. |
| 8,567,795 B2 | 10/2013 | Megens |
| 8,650,715 B2 | 2/2014 | Sonnendorfer et al. |
| 8,684,372 B2 | 4/2014 | Buttazzoni |
| 8,850,656 B2 | 10/2014 | Bernal et al. |
| 8,876,127 B1 * | 11/2014 | Buttazzoni et al. ............ 280/35 |
| 8,876,142 B1 * | 11/2014 | Karasch et al. ............... 280/495 |
| 8,876,145 B1 | 11/2014 | Bernal et al. |
| 8,910,955 B1 | 12/2014 | Buttazzoni |
| 9,010,798 B2 | 4/2015 | Buttazzoni et al. |
| D732,260 S | 6/2015 | Wiley |
| 2002/0003375 A1 | 1/2002 | Kuo |
| 2003/0034636 A1 | 2/2003 | Ng |
| 2003/0155389 A1 | 8/2003 | Swartzentruber |
| 2004/0149609 A1 | 8/2004 | Polumbaum |
| 2004/0173996 A1 | 9/2004 | Anderson |
| 2005/0071949 A1 | 4/2005 | Martinez et al. |
| 2005/0211862 A1 | 9/2005 | Autenrieth |
| 2006/0091632 A1 | 5/2006 | Buck |
| 2006/0097468 A1 | 5/2006 | Sugrue |
| 2006/0279054 A1 | 12/2006 | Chung et al. |
| 2007/0029747 A1 | 2/2007 | Islo et al. |
| 2007/0284900 A1 | 12/2007 | Sze |
| 2009/0167008 A1 | 7/2009 | Autenrieth |

(56) References Cited

U.S. PATENT DOCUMENTS

| | | |
|---|---|---|
| 2009/0178821 A1 | 7/2009 | Zavidniak et al. |
| 2009/0184482 A1 | 7/2009 | Scott |
| 2009/0212514 A1 | 8/2009 | Moorman, Jr. |
| 2010/0066057 A1 | 3/2010 | Jian |
| 2010/0237575 A1 | 9/2010 | Price et al. |
| 2011/0089671 A1 | 4/2011 | Baatz et al. |
| 2011/0138571 A1 | 6/2011 | Tsai |
| 2011/0156367 A1 | 6/2011 | King |
| 2012/0013105 A1 | 1/2012 | Freeman et al. |
| 2012/0087216 A1 | 4/2012 | Keung et al. |
| 2012/0144937 A1 | 6/2012 | Moser et al. |
| 2012/0175853 A1 | 7/2012 | Scicluna |
| 2013/0076002 A1 | 3/2013 | Gafni |
| 2014/0021691 A1 | 1/2014 | Buttazzoni et al. |

* cited by examiner

Fig. 6A
Fig. 6B
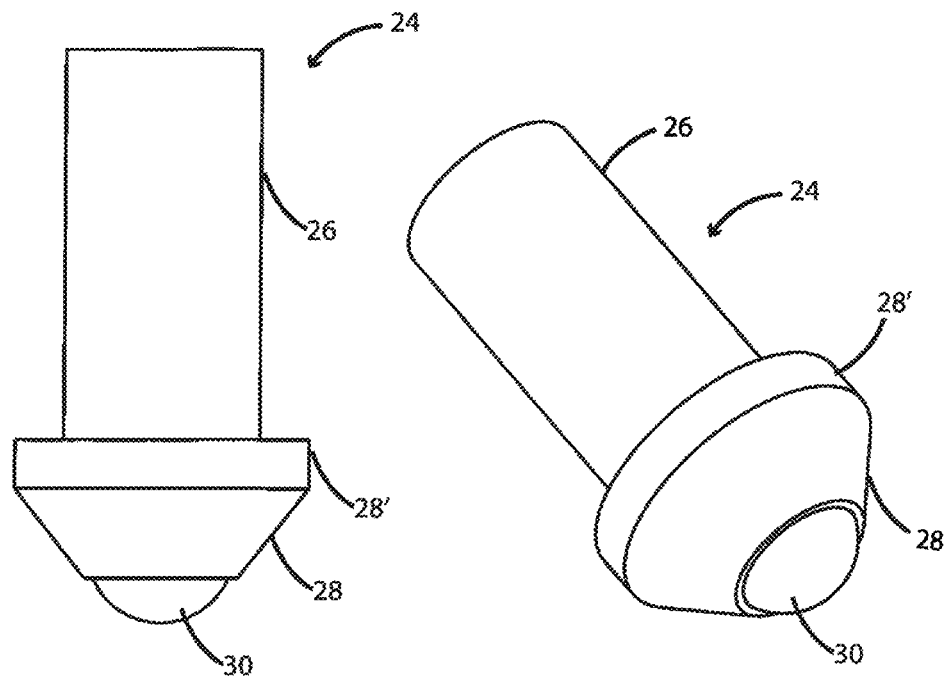
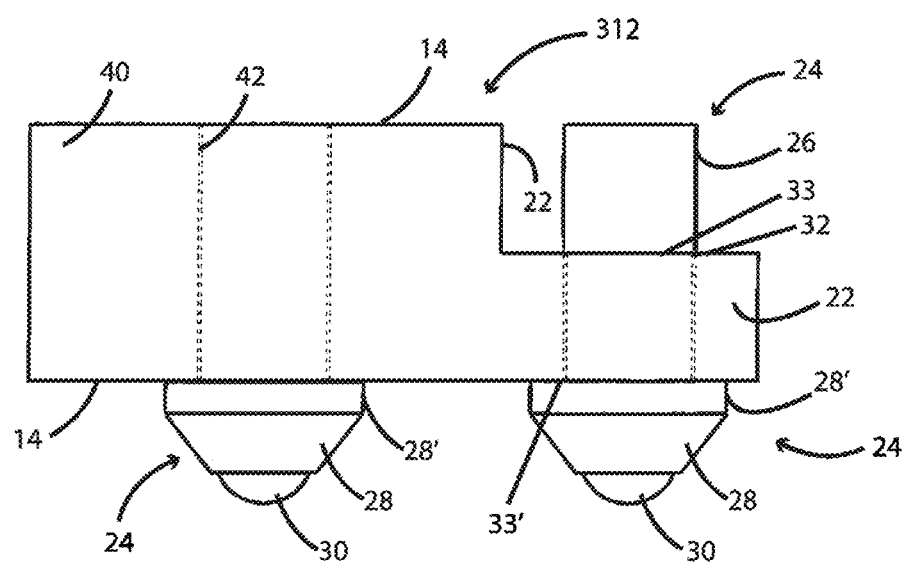
Fig. 21

Fig. 11
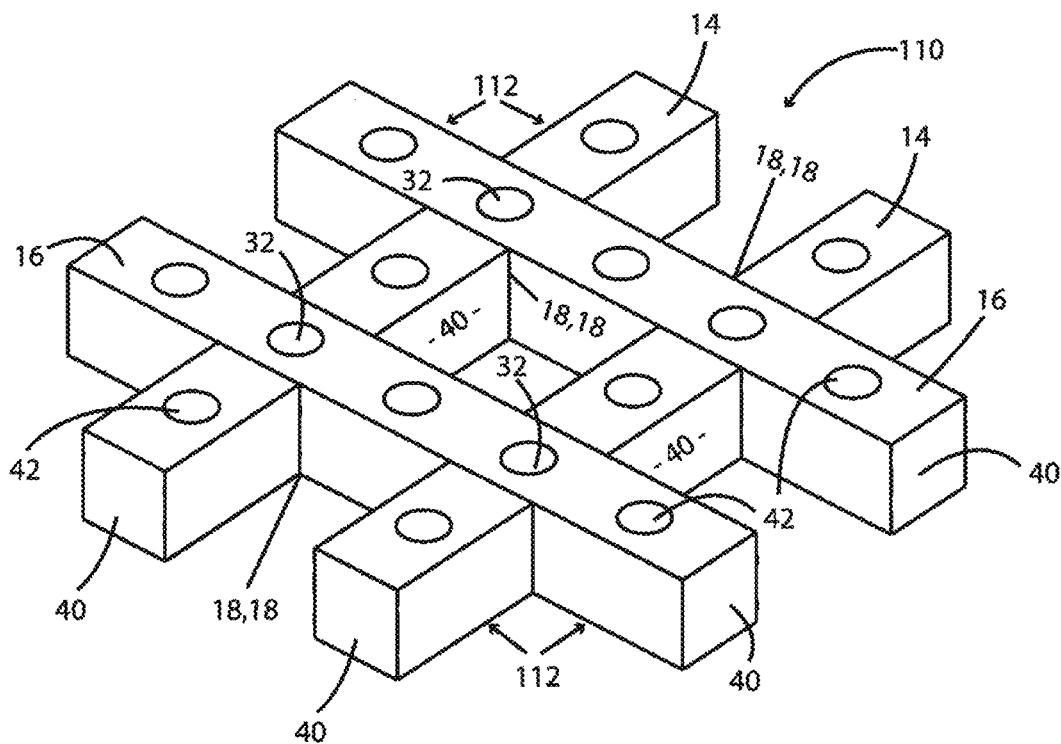
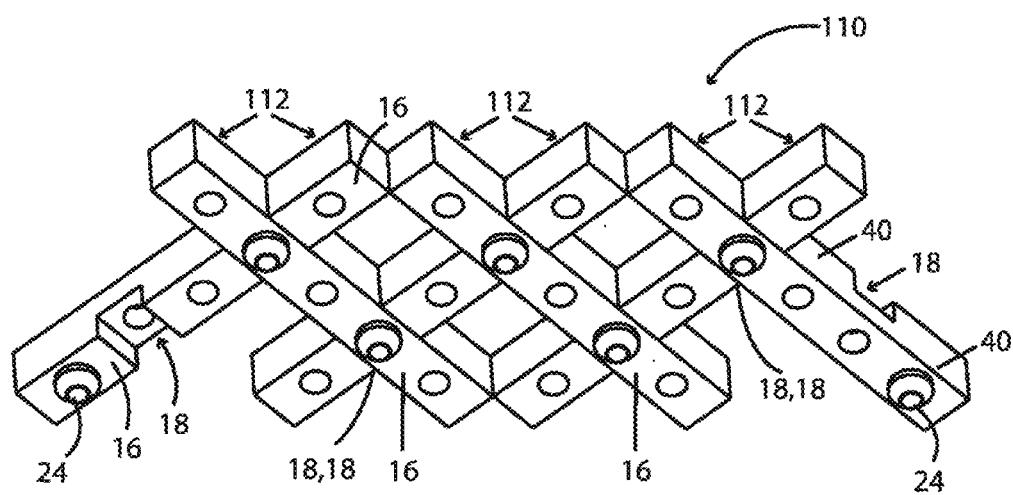
Fig. 12

CASTOR SUPPORTED DOLLY ASSEMBLY CAPABLE OF BEING MADE FROM LIGHTWEIGHT MATERIALS AND OF BEING USED AS A PALLET ASSEMBLY

CROSS REFERENCE TO OTHER APPLICATION(S)

This application is a continuation-in-part of a currently pending U.S. patent application having Ser. No. 14/156,753 and a filing date of Jan. 16, 2014, which is set to issue as U.S. Pat. No. 8,876,127 on Nov. 4, 2014, and which itself was filed as a continuation application and with a claim of priority made to an earlier filed U.S. patent application having Ser. No. 13/942,206 and a filing date of Jul. 15, 2013, which is set to issue as U.S. Pat. No. 8,876,145 also on Nov. 4, 2014. The content of both of these prior filed applications are incorporated herein by reference in their entireties.

BACKGROUND OF THE INVENTION

1. Field of the Invention

The present invention is directed to a dolly or movable platform for carrying loads. The dolly assembly of the present invention comprises a small number of components which greatly facilitate the manufacturing process as well as how to assemble the dolly for use. The present invention relates primarily to a castor supported dolly assembly, but also to a dolly assembly that can be used either with or without castors so as to provide a new pallet assembly. The present invention comprises a plurality of dolly members that are preferably formed of a lightweight material, that may also be disposable or severable, or both. Each dolly member includes one or more connecting segments and at least one supporting segment, and in some embodiments, with each structured to removably receive a castor therein. At least some of the dolly members have substantially equal or sufficiently corresponding structural features so as to be interchangeable when interconnected to form a dolly assembly. As a result, the formed dolly assembly may assume any of a plurality of different supporting orientations necessary to accommodate the physical characteristics of various objects to be movably supported.

2. Description of the Related Art

The use of dolly structures is quite common for different applications and across a variety of different industries. As such, dolly structures can be generally categorized as platform dollies, hand trucks, mobile carts, furniture trucks, etc. In each instance, these different types of dollies are intended for use in movably supporting different types of objects over various surfaces. Moreover, the objects being movably supported may vary in weight, size, configuration, etc., requiring the selection of a particular type of dolly in order to accommodate the physical characteristics of the object(s) with which the dolly is intended to be used. However, the vast majority of known dolly structures, regardless of their use, are typically structured to be heavy, relatively large and formed of durable, comparatively high strength material.

By way of example, platform dollies usually have a relatively large platform supported by a plurality of wheels, rollers, castors, etc., which are fixedly secured to the underportion of the platform. In contrast, hand trucks normally comprise an elongated, vertically extending, upper portion attached to a lower portion having an outwardly extending supporting platform. As with platform dollies, the hand truck usually includes fixedly or permanently attached wheels connected generally at the junction of the upper and lower portions. Somewhat similarly, movable carts for supporting one or more objects of different weights may also be considered a dolly structure. Weight supporting carts normally include a supporting base and a retaining structure associated therewith in a manner which facilitates the movable support of one or more different objects. Similar to the other dollies noted herein, these cart types of dollies are also characterized by a heavy material that is durable construction and intended to have a long operable life.

In addition, each of the above noted types of dolly structures normally includes a fixed or only minimally alterable operative configuration. As such, many known or conventional dolly structures cannot be effectively reduced in size, such as by being collapsed or folded, into a configuration which would facilitate storage, transportation and overall handling thereof, when the dolly structure is not being used.

Also, the structures of some known dolly assemblies may be limited for use in only specific applications. However, a prominent consideration in the design and structuring of conventional dollies is the weight, size and shape of the object(s) that will be carried or supported as a load. In turn, such considerations will most probably affect the size, configuration of and overall weight bearing abilities of the dolly being used. By way of example, large platform dollies are generally intended to accommodate large and/or relatively heavy objects, some of which may have a bulky shape or configuration. Accordingly, dollies of this type are large, heavy and formed of durable materials, and are not intended to be disposable, but in contrast, to have a long operable life.

Some of the problems and disadvantages associated with known or conventional dolly structures, therefore, include their inability to be easily altered in size and/or configuration in order to accommodate the support of objects having different physical characteristics. Because of such a lack of operative versatility, a consumer may be required to purchase or otherwise access a number of different dollies, each intended for a different application.

In turn, lighter weight or smaller dolly structures including, but not limited to hand trucks, may be structured to movably support smaller, relatively lighter loads than the aforementioned platform dollies. These type of dollies may include at least some adjustable features or components in order to facilitate the handling and use thereof. However, such adjustable features do not normally allow the dolly to be enlarged or variably configured into significantly different configurations, which are more adaptive to support objects having larger or unusual shapes.

Therefore, there is an unrecognized need in the field of art relating to the design and manufacture of dollies or other movable support platforms for a dolly assembly that is capable of assuming a variety of different supporting orientations and which is yet also able to facilitate the movable support of a variety of different objects. If any such dolly assembly were made, it would ideally have only a very small number of components so as to greatly facilitate the manufacturing process as well as how one assembles the dolly for use. Any such dolly assembly would ideally have dolly members that are identical and connectable so as to be interchanged and to form a dolly assembly in a variety of operative positions. In addition, the versatility and commercial availability of any such proposed dolly assembly would be enhanced if the all or at least some of the dolly members were formed from a lightweight material that if desired and sufficiently economical, could be readily disposed of. More specifically, a "disposable" material may be determined to be sufficiently inexpensive and readily available to economically justify the disposal thereof after a single use or after a relatively few number of uses. Moreover, the versatility and commercial availability of any such proposed dolly assembly would further be enhanced if the dolly members were formed from a lightweight material that is also severable. It is recognized that if a dolly assembly were created from a lightweight material, or even from a disposable and/or severable material, this may be counterintuitive, but if this were possible and operable, that it could serve to significantly reduce the cost and/or purchase price typically associated with dollies. This, in turn, would readily allow a much larger number of consumers to purchase and/or obtain a dolly, or a requisite number of dolly members for a particular move, whenever and wherever needed, to form an appropriately structured dolly assembly into an accommodating supporting orientation so as to facilitate the movable support of one or more intended objects thereon.

Moreover, it would be ideal if any such dolly assembly were also capable of being assembled and used as a pallet, namely, one that is structured to readily receive the forks or other lifting structure associated with a vehicle commonly known as a fork-lift into passages formed within or underneath the assembly, for moving the pallet and a load carried thereon from one location to another.

SUMMARY OF THE INVENTION

The present invention is directed to a dolly assembly, as well as to a pallet assembly, that solves some or all of these needs that remain in this field of art.

As such, the present invention primarily comprises a dolly assembly having a plurality of removably connectable dolly members that are supported by one or more castors. As explained in greater detail subsequently herein, however, the dolly members are also capable of easily forming a pallet assembly which may, but does not require, the use of castors. Each of the aforesaid dolly members will preferably be of identical construction so as to greatly facilitate the manufacturing process, and will also preferably be formed from a lightweight material, that may be disposable or severable, or both. Additionally, each dolly member of the present invention includes, in most embodiments, an elongated configuration and oppositely disposed first and second outer faces extending along the length thereof. At least some of the plurality of dolly members may have substantially equivalent or at least sufficiently corresponding structural features to assume interchangeable positions with one another, when disposed in a connected orientation relative to at least one other dolly member. As a result, the dolly assembly may assume any one of a plurality of different supporting orientations dependent, at least in part, on the dimension, configuration, weight, etc. of the object(s) being movably supported thereon.

In more specific terms, corresponding structural features of the plurality of dolly members enhance the versatility of the inventive dolly assembly, by enabling it to assume different sizes and/or configurations sufficient to accommodate the object(s) being supported thereon. Therefore, the various configurations or "supporting orientations" of the inventive dolly assembly described herein may include, but are not intended to be limited to, cross-framed configurations, multi-sided configurations, at least partially closed or rectangular configurations and/or variably shaped multi-member configurations. By way of example, the cross-framed configurations may include at least two, connected dolly members transversely oriented relative to one another. The closed configurations may include at least four dolly members connected to one another adjacent their opposite ends to form an at least partially closed, multisided shape. In at least partial contrast, the variably shaped configuration may include a comparatively large number of dolly members interconnected to one another in a partially closed shape, partially opened shape and/or a combination thereof. As a result, the configuration of the formed dolly assembly may substantially conform to and/or accommodate differently sized and/or unusually shaped objects to be supported.

Accordingly, the substantially equivalent or at least sufficiently corresponding structural features of each of the plurality of dolly members include at least one or a plurality of connecting segments formed along the length of the respective dolly members. Moreover, each of the connecting segments includes a slot and a base that may be, and preferably will be, but does not have to be, cooperatively disposed, dimensioned and structured to fit within one another. The slot of each connecting segment extends inwardly from the first outer face of the corresponding dolly member inwardly to the corresponding base. Each base of the connecting segments extends from an inner boundary of the slot to the second outer face of the corresponding dolly member. Further, each base comprises an aperture or passage extending there-through and including opposite open ends. One outer open end of each base is in aligned, coincident relation with the second outer face and the other or inner open end thereof is disposed in direct, open communication with the corresponding slot.

Further, a connected orientation between any two of the dolly members will preferably comprise a connecting segment of each of the two dolly members being disposed in engaging, substantially interlocking relation to one another. As such, the connecting orientation further comprises the slot of one connecting segment of one dolly member disposed in receiving relation to the base of the other of the two dolly members. In addition, the apertures or passages of the confronting bases of the engaging connecting segments are disposed in communicating, preferably coaxial, alignment with one another, so as to removably and concurrently receive and retain a connecting stem or portion of a castor therein. Moreover, each of the apertures of passages are cooperatively dimensioned and configured with the connecting stem or other connecting portion of the castors so as to establish a removable but stable, press fit, frictional or other secure but removable connection there between.

More specifically, when a castor is removably connected to the engaging connecting segments disposed in the aforementioned connecting orientation, the castor will concurrently extend into and at least partially through each of the coaxially aligned passages. The castor thereby serves to interconnect or interlock corresponding, confronting bases of the interconnected connecting segments as well as the corresponding dolly members. It should be appreciated as well, however, that the corresponding structure on each of the dolly members in the form of connecting segments, including a slot and a base which are capable of interlocking with another on a different dolly member also allows for the sung interconnection of two or more dolly members. The versatility of the present inventive dolly assembly, then, specifically including interconnection of each of the two or more dolly members, is enhanced by the fact that the castor may be placed into and at least partially through the aligned passages of engaging connecting segments through the second outer face of either of the connected dolly members. As a result, each of any two interconnected dolly members may assume an interchangeable operative, supporting position, as will be explained in greater detail herein after.

Other structural features associated with the plurality of dolly members include each of the slots of each of the connecting segments of the plurality of dolly members having a substantially equivalent dimension and configuration. In addition, the depth of each slot of each connecting segment is substantially equal to the thickness of the corresponding base of each connecting segment. This cooperative structural feature provides for engaging connecting segments of interconnecting dolly members being cooperatively dimensioned such that, any two dolly members disposed in the aforementioned connected orientation have the first outer face of one of the dolly members disposed in substantially coplanar relation with the second outer face of the other of the two dolly members. This coplanar relation of the first and second outer faces of the connected dolly members will extend to each of a larger number of dolly members which are connected into any one of the possible operative configurations or supporting orientations, as generally set for the above. Accordingly, the plurality of dolly members are cooperatively dimensioned, configured and structured to facilitate the interchangeable cooperative positioning thereof to form the plurality of different supporting orientations of the formed dolly assembly.

Additional structural features of at least some of the plurality of elongated dolly members include the provision of one or more supporting segments. In at least one preferred embodiment, each of at least two supporting segments may be located adjacent a different opposite end of the dolly member and one or more supporting segments may be formed intermediate the opposite ends. In addition, the corresponding connecting segments may be spaced apart and located between or intermediate the oppositely disposed supporting segments. Also, one or more preferred embodiments of at least some of the dolly members comprises one of the plurality of connecting segments being disposed immediately adjacent or substantially contiguous to a supporting segment located adjacent an opposite end of the corresponding dolly member.

Further, at least some of the dolly members may include more than two supporting segments, depending at least in part on the length and/or intended use of the dolly member(s). Therefore one or more additional preferred embodiments of the dolly assembly may include at least some of the dolly members having a plurality of the supporting segments disposed in spaced relation to one another along the length of the dolly member. Therefore, when more than two supporting segments are formed on the same dolly member, the plurality of connecting segments and the plurality of supporting segments may be alternately arranged. In such a structural configuration, each of the plurality of connecting segments is typically, but not exclusively, located between two supporting segments, along the length of the corresponding dolly member.

In addition, each of the one or more supporting segments includes a channel extending there through and structured for a removable, but stable, frictional or press fit connection to a castor. Each of the channels include opposite open ends disposed coincident to a different one of said first and second outer faces of a corresponding dolly member. Therefore, each of said channels are disposed and dimensioned to removably receive and retain a stem or other connecting portion of the castor therein through either of said opposite open ends and through either of the corresponding first and second outer faces. These structural features also facilitate the interchangeable use of the dolly members by allowing the supporting castors to be connected to each of the supporting segments by entering the channels thereof by initially passing through either the first outer face or the second outer face, dependent on the position of the corresponding dolly member in the formed dolly assembly.

In addition, the versatility and economic availability of the dolly assembly of the present invention will be enhanced by forming at least some of the plurality of dolly members if not all or most parts, from a lightweight material. This material may also be but does not have to be disposable, if deemed sufficiently economical to throw away, and at least in some cases, the material used may be recyclable or environmentally friendly. In more specific terms, a "disposable" material may comprise a paper based material that may also be eco-friendly such as, but not limited to, cardboard and similar types of materials. However, foam based material such as Styrofoam® or other types can also be used for the present invention, including plastic materials, vinyl or PVC materials, pressed or composite particulate materials, laminates and other lightweight materials whether now known or yet to be discovered. Further, any of the materials used may be predetermined to be sufficiently inexpensive and plentiful to economically justify the disposable thereof after a single use or after a relatively few number of uses thereby, in at least some embodiments, intentionally providing a relatively short operable life. However, the formation and/or production of the plurality of dolly members from a lightweight, disposable material will significantly reduce the cost and/or purchase price of the dolly members thereby allowing them to be available and attractive to a larger number of consumers. This feature may be unique to the dolly industry. Also, the above categories of disposable material, as well as others not specifically mentioned, from which at least some of the dolly members are formed, may also be recyclable or environmentally friendly, thereby eliminating or significantly reducing any disadvantages associated with the disposal of relatively large numbers of the dolly members.

Moreover, the material from which each of the plurality of dolly members may be formed may, in addition to being light weight, disposable, recyclable, etc. may also be severable. As a result, shorter dolly members may be formed from the longer dolly members by severing a portion of the longer dolly member from its original length. Such severing, separation or disconnection can be accomplished using any common or conventionally structured tool such as, but not limited to, saws, knives or other common and readily available cutting devices or instruments. The severable characteristics of the material used in forming the dolly members allows a consumer to purchase or obtain a single, comparatively long dolly member, rather than a plurality of individual pre-cut dolly members.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 4B top perspective view of the embodiment of FIG. 4A.

FIG. 6A is a front elevational view of one of a plurality of castor assemblies used to removably support the dolly assembly of the present invention in its various supporting orientations.

FIG. 6B is a top perspective view of the embodiment of FIG. 6A.

FIG. 11 is a top perspective view of the embodiment of FIG. 10.

FIG. 12 is a bottom perspective view of a dolly assembly formed from a plurality of interconnected dolly members as represented in FIGS. 7 and 8 into one of a plurality of different supporting orientations.

FIG. 21 is a side view in partial phantom including castors removably connected thereto.

Like reference numerals refer to like parts throughout the several views of the drawings.

DETAILED DESCRIPTION OF THE PREFERRED EMBODIMENT

The following detailed description of the invention in connection with the attached drawings is intended as a description of the invention in one or more currently preferred embodiments of the dolly assembly and/or pallet assembly, and is not intended to represent the only forms in which the invention is constructed or utilized. Thus, the following description should not limit the invention to these embodiments, but rather, to enable any person skilled in the art to make and use this invention. It should, therefore, be understood that the same or equivalent functions and structures may be accomplished by different embodiments that are also intended to be encompassed within the spirit and scope of the invention.

Figure 23:
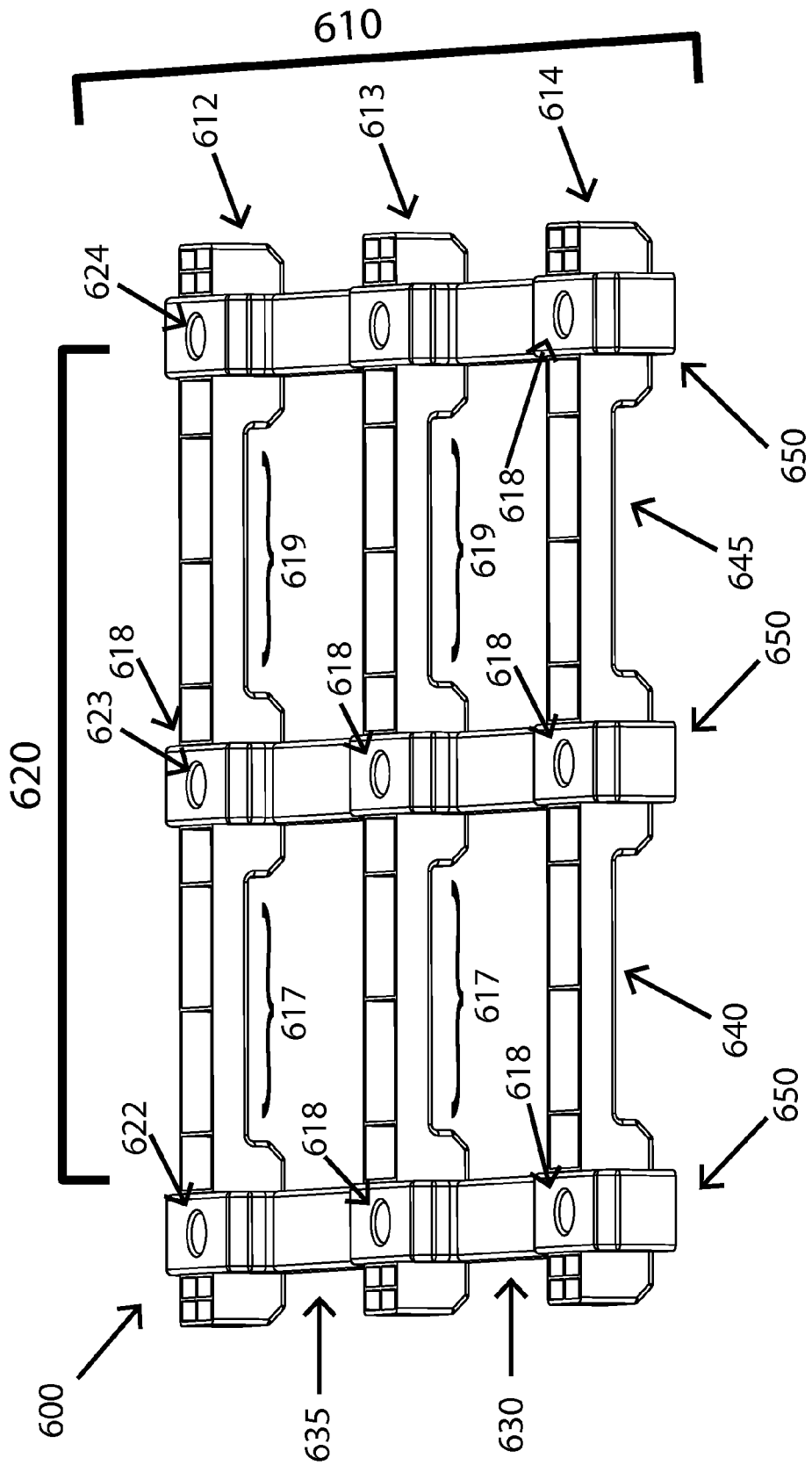
FIG. 23 is a front perspective view of a pallet assembly in assembled form in another embodiment utilizing a plurality of dolly members in accordance with the present invention, and illustrating the use of castors.
Figure 24:
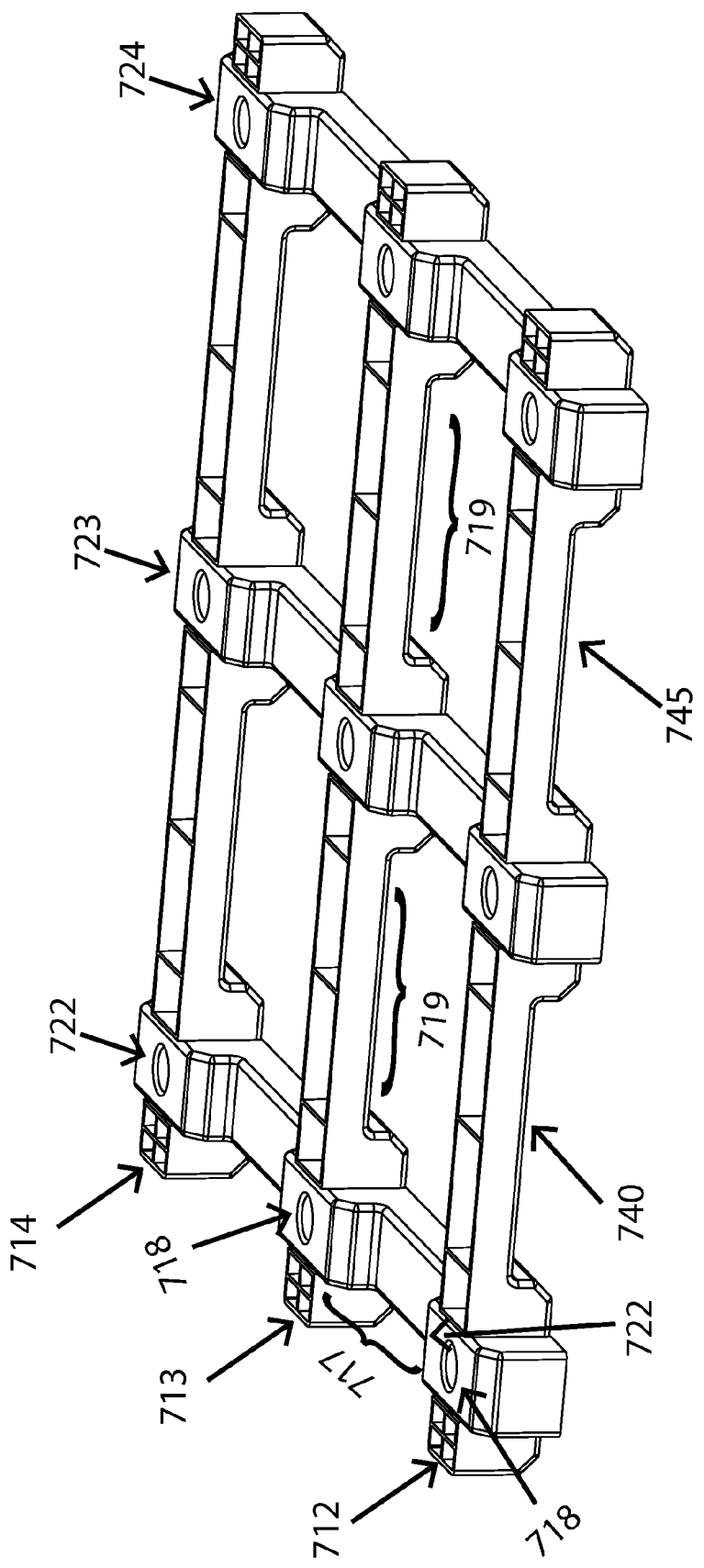
FIG. 24 is a perspective view of a pallet assembly in assembled form in one embodiment and utilizing a plurality of dolly members in accordance with the present invention without any castors.

With the foregoing in mind, the present invention is directed to a dolly assembly structured to be movably supported by at least one, but more practically, by a plurality of castors removably connected thereto at various locations, dependent on the supporting orientation into which the dolly assembly is formed. As will be described in greater detail herein, however, the dolly assembly of the present invention can also be structured for use, either with or without castors, so as to provide a new pallet assembly 600 or 700, respectively, as shown in FIGS. 23 and 24.

Accordingly, the dolly assembly comprises a plurality of elongated or other appropriately configured dolly members having the structural versatility to be removably interconnected to one another so as to collectively define different configurations or "supporting orientations" of the resultant dolly assembly. Therefore, and as will be represented and described in greater detail hereinafter, the formed dolly assembly may assume any one of the plurality of possible different supporting orientations dependent, at least in part, on the dimension, configuration, weight and possibly other physical characteristics of the object or objects being movably supported by the formed dolly assembly.

As shown in the accompanying drawings and as will also be explained in greater detail herein, the plurality of possible supporting orientations may include, but are not intended to be limited to, a cross-framed configuration, a multi-sided configuration, a partially open and/or closed or partially closed configuration, and/or variably shaped, multi-member configurations.

It is further emphasized that the versatility and commercial availability of the dolly assembly of the present invention will be enhanced by forming each or at least some of the plurality of dolly members from a lightweight material, which may also be disposable, recyclable and possibly also, but not necessarily, severable material. The severable characteristics of the material used in forming the dolly members could allow a consumer to purchase or obtain a single, comparatively long dolly member, rather than a plurality of individual, pre-cut dolly members of a particular size only. More specifically, shorter dolly members may be formed from one or more, longer dolly members by severing a portion of the longer dolly member from its original or subsequently reduced length.

More specifically, the material used to form the inventive dolly assembly described herein may comprise a paper-based material, such as cardboard and other substantially similar as well as structurally and operationally equivalent materials. Other appropriate materials may include, but not be limited to, a foam based material whether Styrofoam® or other types, plastic materials, pressed or composite particulate materials, laminates and other lightweight materials whether now known or yet to be discovered. As such, the lightweight materials may also be readily disposable, if determined to be sufficiently inexpensive to economically justify the disposal thereof after a single use or after a relatively small number of uses. Therefore, it is recognized that the formation of the plurality of the dolly members and the resultant formed dolly assembly may have a relatively short operable life.

However, the fact that the material from which the dolly members and resultant dolly assembly are formed is lightweight, disposable, recyclable and/or possibly severable, will significantly reduce the cost and/or purchase price of the dolly members. In turn, this will allow the consuming public to purchase and/or obtain a requisite number of the dolly members to form an appropriately structured dolly assembly into an accommodating supporting orientation to facilitate the movable support of one or more intended objects thereon. Further, the dolly members may be commercially available individually or in pre-packaged numbers, wherein the dolly members may be substantially equivalent in size or purposefully variable in size and/or configuration. As a result, the consumer will be allowed to select the number, size, etc. of dolly members which enable the formation of a dolly assembly having an appropriate one or more supporting orientations to accommodate the movable support of one or more objects, as set forth above.

Figure 1:
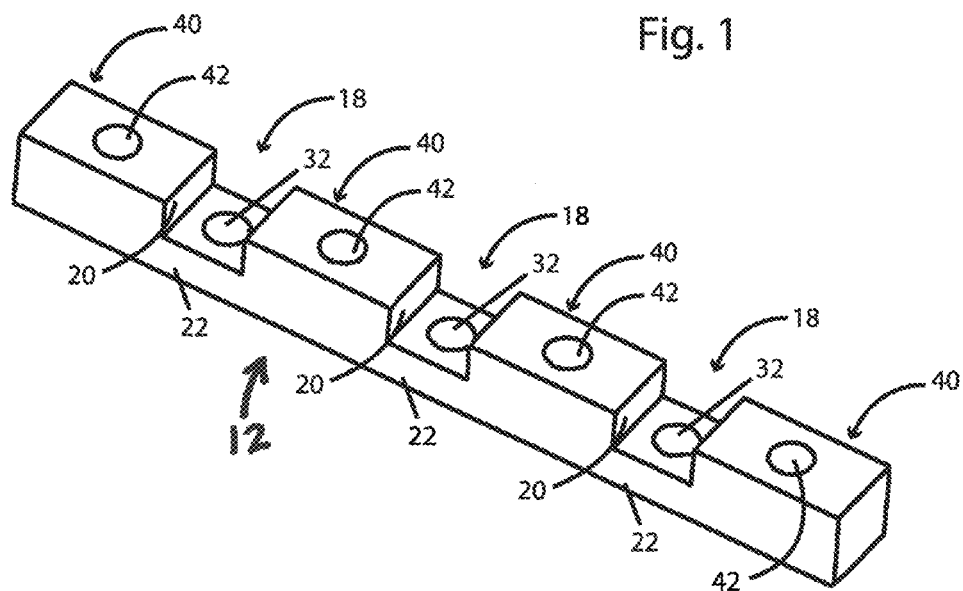
FIG. 1 is a perspective view of one preferred embodiment of a dolly member, which when assembled with similar dolly members comprises a dolly assembly.
Figure 2:
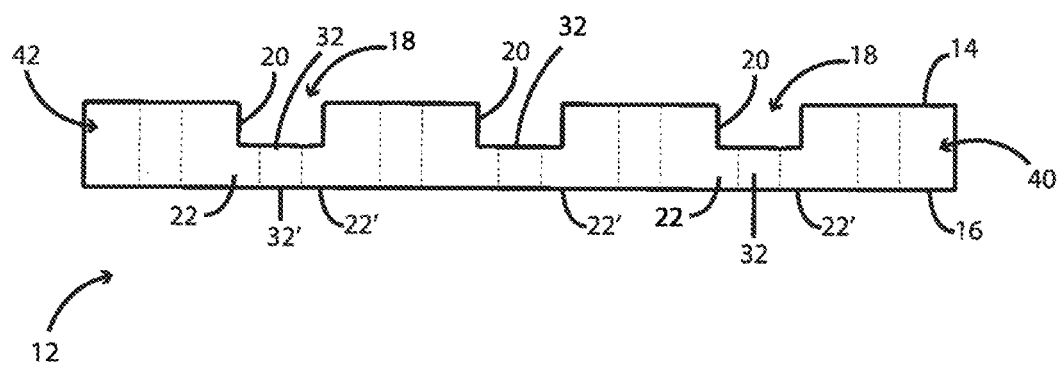
FIG. 2 is a side view in partial phantom of the embodiment of FIG. 1.

With primary reference now to FIGS. 1 and 2, there is illustrated a dolly member 12 in one preferred embodiment which as shown in FIGS. 3-5C, can be used to form a dolly assembly 10 according to the present invention. The dolly assembly 10 is formed by removably interconnecting a plurality of the dolly members 12 into any one of a plurality of possible supporting orientations needed to accommodate an object or objects being movably supported thereon as represented in FIGS. 3 through 5C and others. Moreover, each of the plurality of dolly members 12 used to form a dolly assembly 10 will have substantially equivalent or at least sufficiently corresponding structural features to configure the dolly assembly 10 into a plurality of different supporting orientations. In the most preferred embodiments, each of the dolly members 12 are substantially if not completely identical, meaning that the corresponding structural features allow any of the dolly members 12 to be interchangeable with one another so as to assume any operative position in the formed dolly assembly 10. In other words, in an ideal embodiment, the dolly members are identical and reversible, so that when a user begins to form a dolly assembly 10, it can be without regard to locating a particular dolly member to initiate and complete the process.

Referring now to FIG. 2, in the preferred embodiments each of the dolly members 12 includes an elongated configuration having a first outer face 14 and a second, oppositely disposed outer face 16, both extending along the length of the dolly member 12. In addition, each of the plurality of dolly members 12 includes at least one, but in many embodiments, a plurality of connecting segments, generally indicated as 18. Each of the connecting segments 18 includes a slot 20 and a base 22. As represented, each of the slots 20 is recessed inwardly from the first outer face 14 to a point where each slot 20 terminates at the base 22. In cooperation therewith, each of the bases 22 has an outer or exposed surface 22' coincident with the second outer face 16 and an inner surface terminating at the inner most boundaries of the corresponding slot 20.

As set forth above, the dolly assembly 10 is movably supported by at least one, but more practically, a plurality of castors 24, such as but not limited to, the type represented in detail in FIGS. 6A and 6B. However, each of the castors 24 will include a connecting portion or stem 26 and a housing or body portion 28 in which an inline roller ball 30 is rotationally retained. Also, the housing 28 includes at least a portion thereof as at 28' having a greater size and/or larger transverse dimension than that of the stem 26. When assembled or connected, the larger portion 28' will engage a corresponding outer surface 14 or 16 and prevent passage of the entire castor 24 completely through the passage 32 or channel 42 in which the stem 26 of the castor is inserted.

Accordingly, and in the preferred embodiments, each of the connecting segments 18 is structured to removably receive and retain one of the plurality of castors 24 therein. Each of the connecting segments 18 includes an aperture or passage 32 formed in and extending completely through each base 22. The passage 32 includes oppositely disposed open ends 33 and 33'. One open end 33 facilitates open communication with the corresponding slot 20 and the opposite open end 33' is coincident with and formed in the plane of the second outer face 16 as represented throughout the Figures. Further structural features of each of the dolly members 12 includes the depth of the slot 20 being substantially equal to the thickness of the corresponding base 22. As a result, interconnection of any two dolly members 12 to form a corresponding dolly assembly 10 will result in the first outer face 14 of one of the two connecting dolly members being disposed in coplanar relation with the second outer face 16 of the other interconnected dolly member 12, as represented in FIGS. 4A through 5C.

As indicated, each of the connecting segments 18 are cooperatively disposed and structured on each of the dolly members 12 to facilitate a connection between at least two dolly members into a "connected orientation". More specifically, the connected orientation of any two dolly members 12 comprises a confronting relation of the bases 22 of the engaging connecting segments 18, 18 and communicating relation of the apertures or passages 32 of the confronting bases 22 of the connected dolly members 12. As also indicated above, each of the connecting segments 18 is structured to removably retain a castor 24 therein so as to facilitate adequate, stable and movable support of the resultant, formed dolly assembly 10. It should be appreciated, however, with regard to one embodiment of the dolly assembly capable of use as a pallet assembly and shown in FIG. 24, that a modified castor assembly could be utilized, such as one with only portions 26 and 28, and not the use of a roller ball or wheel. Accordingly, and referring back to the dolly members 12, the passages 32 associated with engaging connecting segments 18 are disposed in coaxial relation to one another and are cooperatively dimensioned such that the stem or connecting portion 26 of a castor 24 may be concurrently received and retained in the coaxially aligned apertures 32 of engaging connecting segments. Therefore, the receipt and retention of the connecting stem 26 of the castor 24 concurrently within each of the coaxially aligned passages 32 will serve to interlock the bases 22 of engaging connecting segments 18.

Additional cooperative dimensioning of each of the passages 32 of the dolly members 12 with the connecting stem 26 or other connecting portion of the castor 24 serves to define a frictional engagement or press fit connection of the connecting stem 26 with the interior surface portions of each of the coaxially aligned passages 32 of engaging ones of the connecting segments 18. Such a frictional or press fit engagement of the castor in each of the passages 32 will be sufficiently stable to maintain the interlocking relation between engaging or confronting bases 22, but will permit removal of the castors 24 from their supporting position upon the exertion of appropriately directed force (pulling or pushing) on the castor 24.

Still referring to FIG. 1, yet additional structural features of the plurality of dolly members 14 include the provision of at least one but, dependent at least partially on the length of the dolly member, a possible plurality of supporting segments, generally indicated as 40. Each supporting segment 40 preferably has a thickness corresponding to the depth of the slot 20 combined with the thickness of the corresponding base 22 of each of the connecting segments 18. Therefore, the thickness of each supporting segment 40 is sufficient to dispose the outer exterior surfaces thereof coincident to and/or coplanar with the first and second outer faces 14 and 16. In addition, each or at least some of the supporting segments 40 include a channel 42 extending therethrough such that opposite open ends of the channel 42 communicate with and are substantially coincident with the oppositely disposed outer faces 14 and 16. Moreover, each of the channels 42 may be substantially equivalently dimensioned and configured to the apertures or passages 32 associated with each of the connecting segments 18. The dimension and configuration of each of the through channels 42 are also cooperatively dimensioned with the connecting stem or portion 26 of each of the castors 24 so as to define the aforementioned frictional or press fit engagement with and removable, stable retention of the castors 24, within each of the supporting segments 40.

Therefore, in the formation of the plurality of possibly supporting orientations of the dolly assembly 10 a plurality of castors 24 may be removably connected to the plurality of interconnecting dolly members 12 at various locations. As represented in the various supporting orientations of FIGS. 3 through 5C, each of the plurality of connecting segments 18 and supporting segments 40 may be structured to receive a single castor 24 therein. However, dependent on the preferred or appropriate supporting orientation in which the dolly assembly 10 is formed, the plurality of castors 24 may only be removably retained in some of the connecting segments 18 and/or supporting segments 40.

The ability to interchange the positions of the dolly members with one another, in any of the supporting orientations of the formed dolly assemblies, is facilitated by the cooperative dimensioning, configuring and structuring of both the connecting segments 18 and supporting segments 40 associated with each of the preferred embodiments of the dolly members of the present invention, represented throughout the accompanying Figures. In more specific terms, a castor 24 may be removably retained into and through engaging segments 18 of any two connected dolly members by passing the connecting stem 26 through the second outer face 16 concurrently into the coaxially aligned apertures 33 of confronting bases 22 of engaging connecting segments 18. However, the open ended channel 42 of each of the supporting segments is structured to removably receive and retain the connecting stem 26 of a castor 24 through either opposite open end and accordingly through either of the correspondingly disposed first outer face 14 or second outer face 16. As a result, any of the plurality of the preferred embodiments of the dolly members including, but not limited to, the dolly members 12 represented in the various supporting orientations of FIGS. 3 through 5C, may be interchanged with any other dolly member 12 associated with the same dolly assembly 10 regardless of the supporting orientation in which the dolly assembly 10 is formed.

Figure 3:
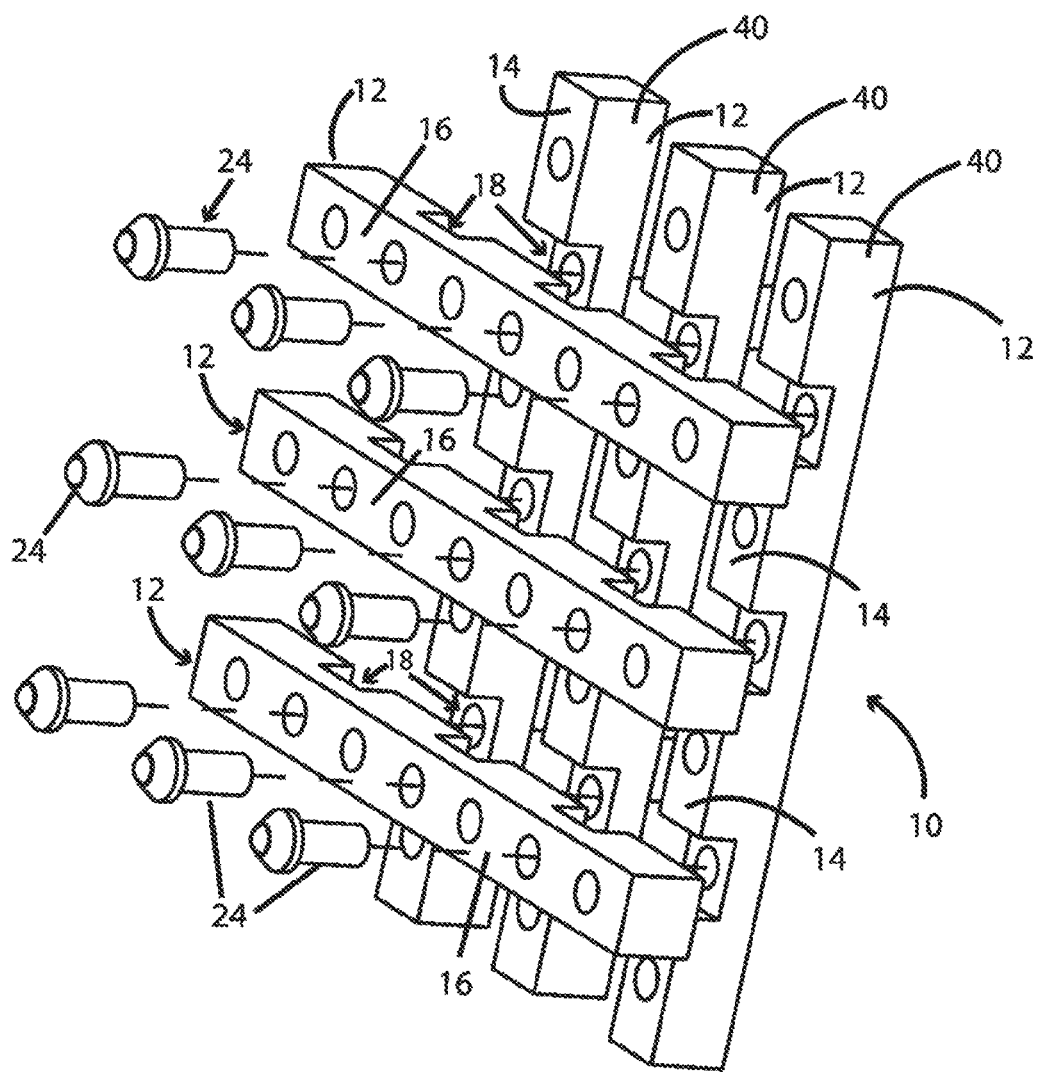
FIG. 3 is an exploded view of a plurality of dolly members of the embodiment of FIGS. 1 and 2 in preassembled orientation including supporting castors being attached thereto.
Figure 4A:
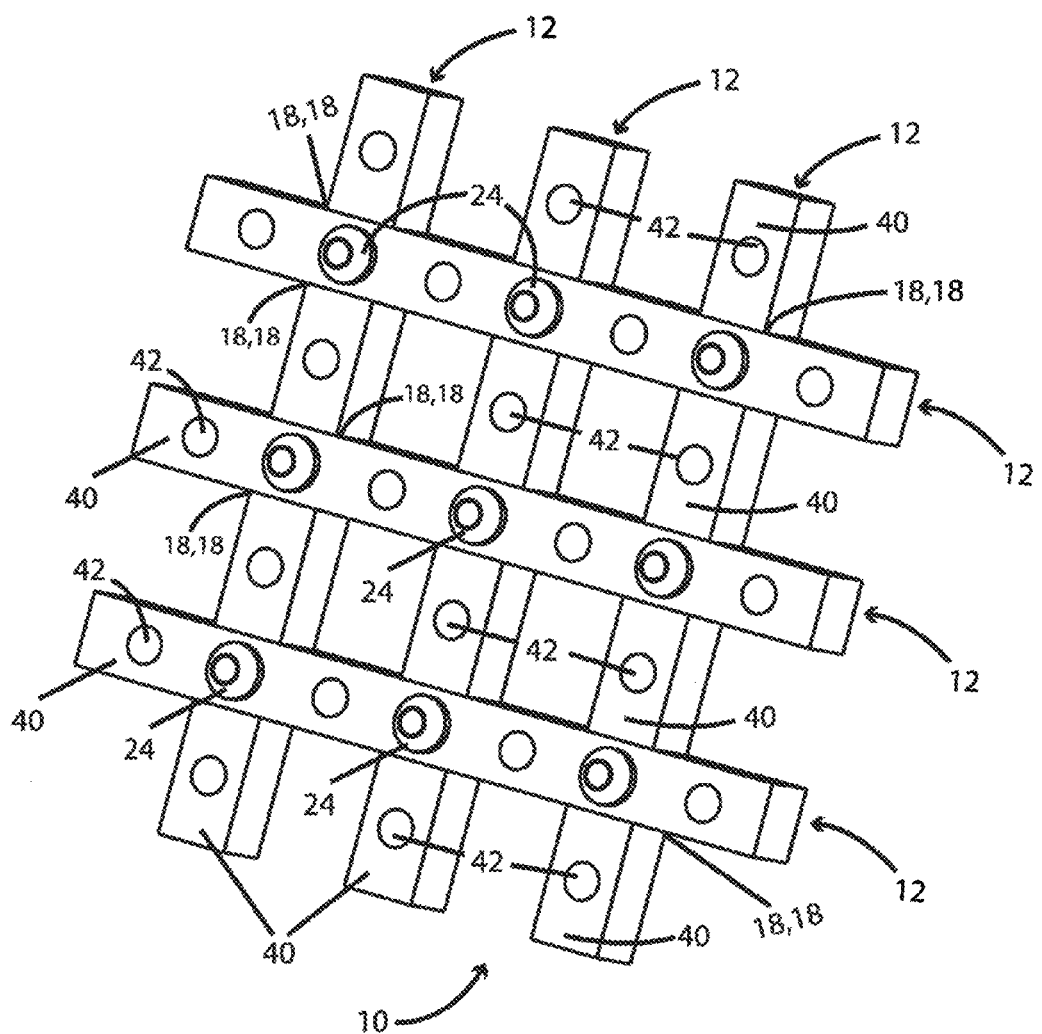
FIG. 4A is bottom perspective view of the embodiment of FIG. 3 in assembled form.
Figure 4B:
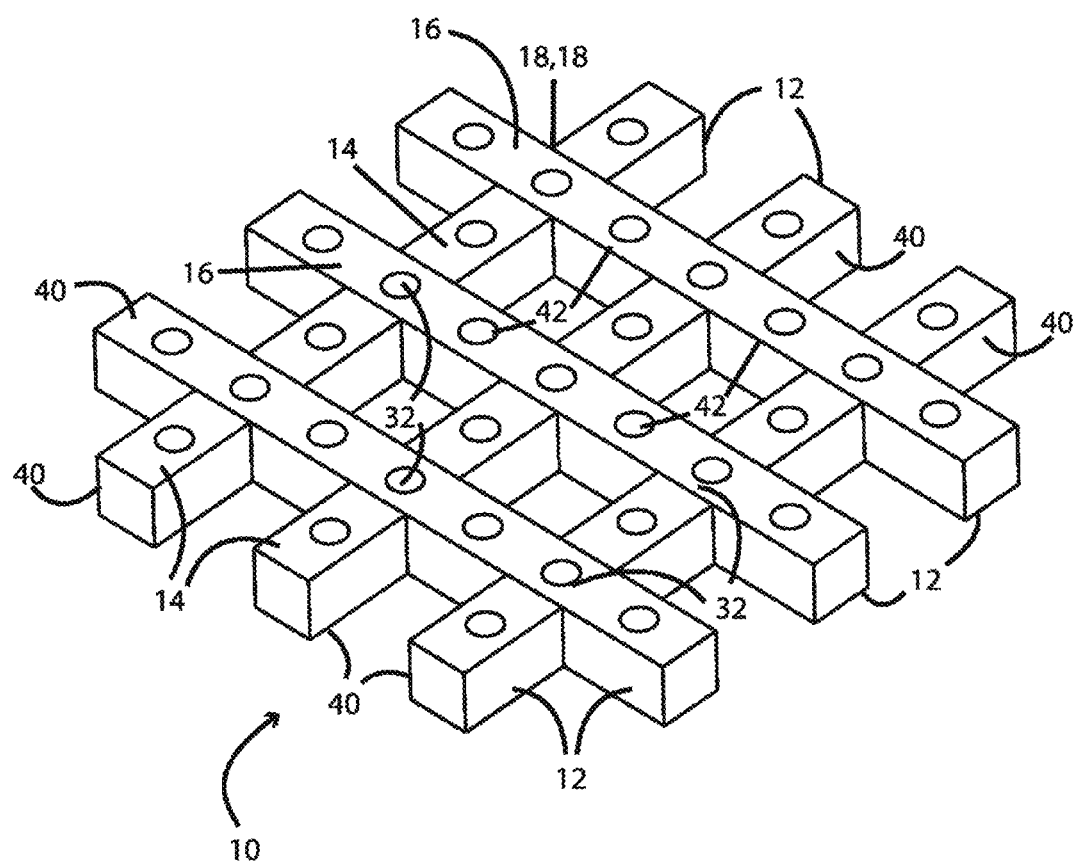

With reference now to FIGS. 3 through 4B, at least one of the possible supporting orientations of the dolly assembly 10, utilizing a plurality of dolly members 12, may assume the interconnected dolly members being disposed in transverse relation to one another. In this supporting orientation, each of the connecting segments 18 of each of the dolly members 12 are connected to one another, such that coaxially aligned apertures 32 of the bases 22 are disposed in concurrent receiving and retaining relation to different ones of a plurality of castors 24. As set forth above, the concurrent passage of the connecting portions of the stems 26 of each of the castors 24 through the coaxially aligned apertures 32 will serve to interlock the confronting bases 22 of engaging connecting segments 18, as clearly represented. It is of further note that while any one of a plurality of castors 24 may be removably inserted and retained within the channels 42 of the supporting segments 40, such may not be necessary as clearly demonstrated in FIG. 4A. However, dependent on the overall weight and/or size of the object or objects being movably supported on the dolly assembly 10, it may be preferred to insert additional castors 24 in additional ones or all of the supporting segments 40.

Figure 5A:
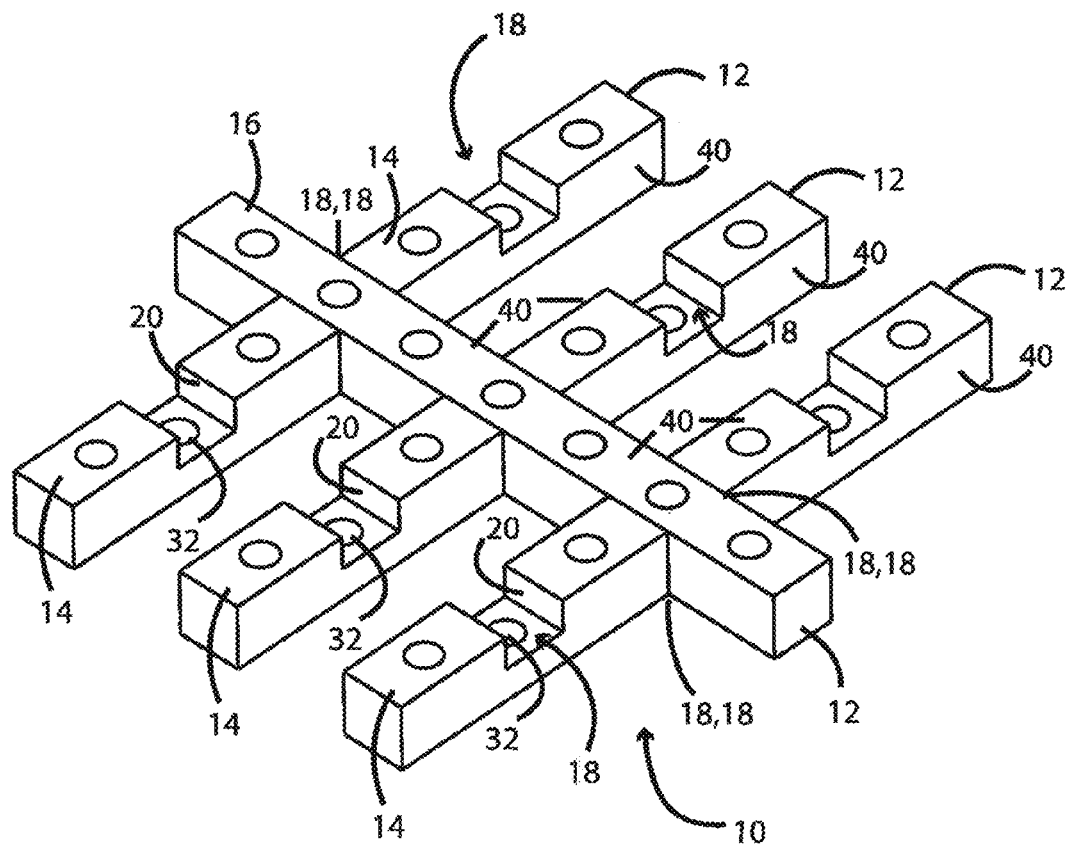
FIG. 5A is a top perspective view of a dolly assembly formed from the dolly members of the embodiment of FIGS. 1 and 2 into one of a possible plurality of different supporting orientations.
Figure 5B:
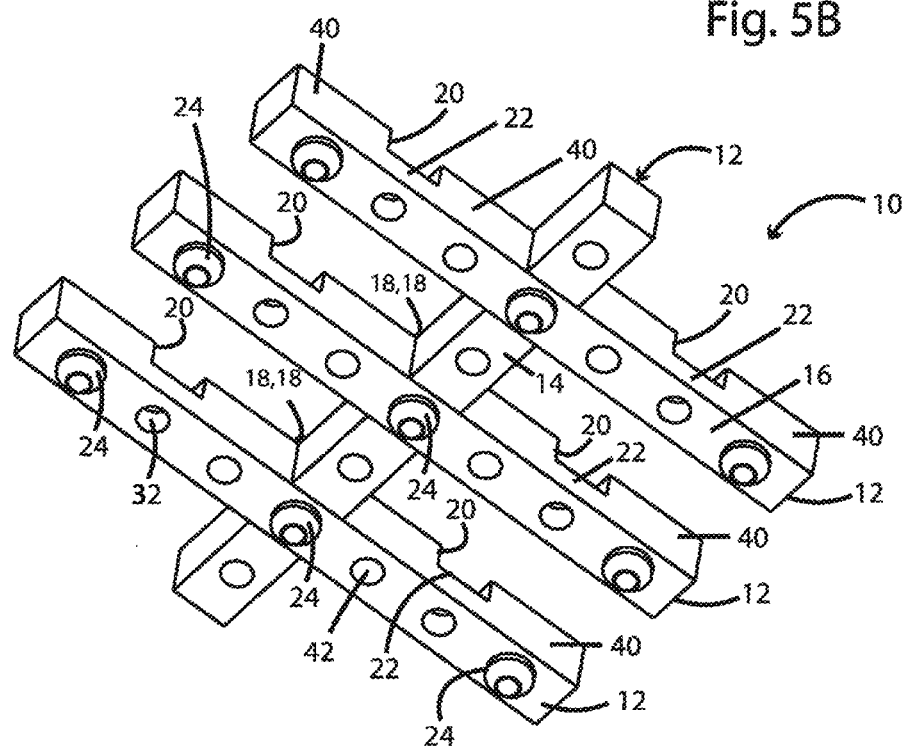
FIG. 5B is a bottom perspective view of the embodiment of FIG. 5A.

With primary reference now to FIG. 5B, yet another supporting orientation comprises a plurality of dolly members 12 being interconnected by a common, somewhat centrally located dolly member 12 so as to more or less to define a supporting orientation into somewhat of a "cross-framed" configuration. In this supporting orientation, each of the supporting segments 40 located adjacent opposite ends of the interconnected dolly members 12 include castors 24 removably connected therein. Similarly, the centrally located interconnecting dolly member 12 includes a plurality of castors 24 passing through engaging connecting segments of the plurality of interconnected dolly members 12.

Figure 5C:
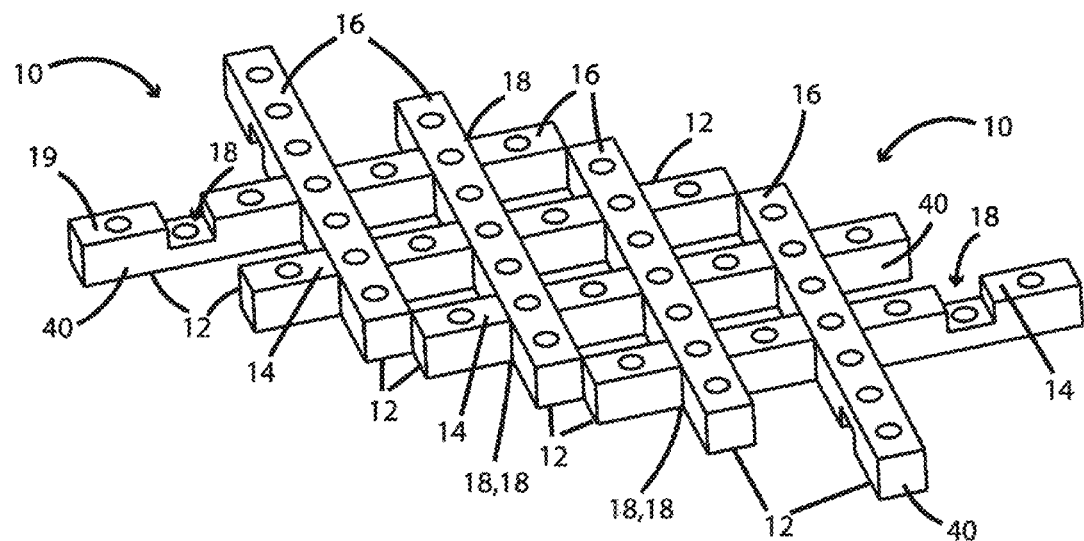
FIG. 5C is another preferred embodiment of the dolly assembly comprises of a plurality of dolly members, as represented in FIGS. 1 and 2 into a different supporting orientation from that represented in FIGS. 4A through 5B.

FIG. 5C represents another supporting orientation of the dolly assembly 10 which includes both closed portions within the a substantially central area of the formed dolly assembly 10, as well as open areas located along the outer periphery of the dolly assembly 10. In any event, the structural and operative versatility of the dolly assembly 10, formed by a plurality of interconnected dolly members 12 allows an individual to form the dolly assembly 10 into a variety of supporting orientations. Moreover, each of the possible supporting orientations may include a variable and/or changeable configuration depending upon the size, shape, weight, etc., of the object or objects being movably supported thereon.

With primary reference now to FIGS. 7 through 12, yet another preferred embodiment of the dolly assembly is generally represented as 110. Moreover, the dolly assembly 110 can also be disposed into any of a plurality of different supporting orientations, as represented in FIGS. 9 through 12, by interconnection of a plurality of dolly members 112. Similar to the dolly member 12 as represented in detail in FIGS. 1 and 2, the dolly member 112 has an elongated configuration and a first and second outer face 14 and 16 extending along the length thereof. Also, the dolly member 112 includes a plurality of connecting segments 18, each having a slot 20 terminating in a correspondingly disposed base 22. Also, a passage 32 is open ended as at 33 and 33' and extends completely through each of the bases 22 of each of the connecting segments 18.

Figure 7:
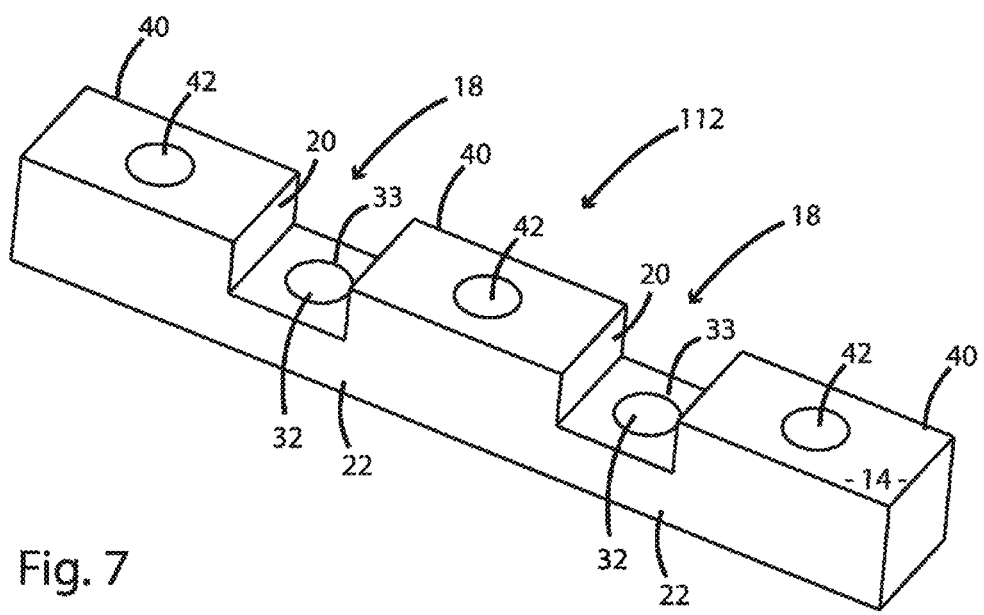
FIG. 7 is a perspective view of yet another preferred embodiment of one of a plurality of dolly members which may be assembled to form a dolly assembly in a plurality of different supporting orientations and which is operatively similar to but structurally distinguishable from the structure of the dolly member as represented in FIGS. 1 and 2.
Figure 8:
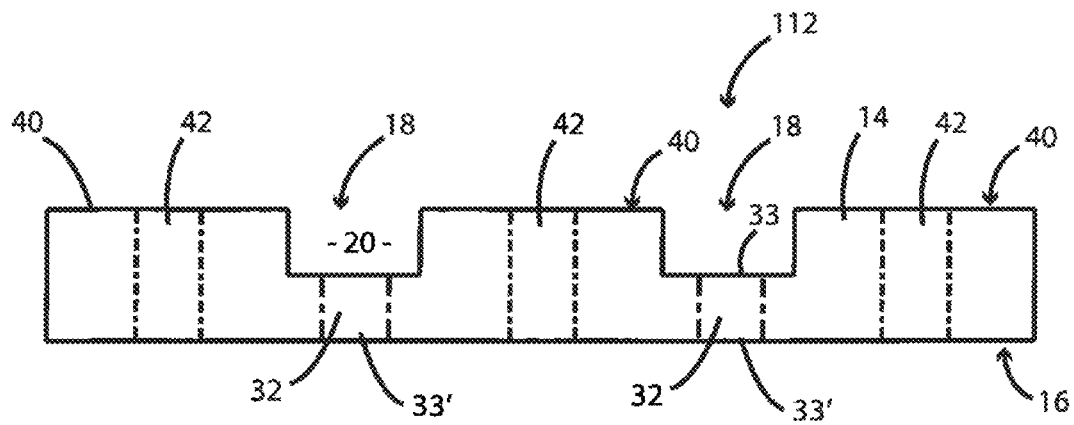
FIG. 8 is a side elevation view in partial phantom of the embodiment of FIG. 7.
Figure 9:
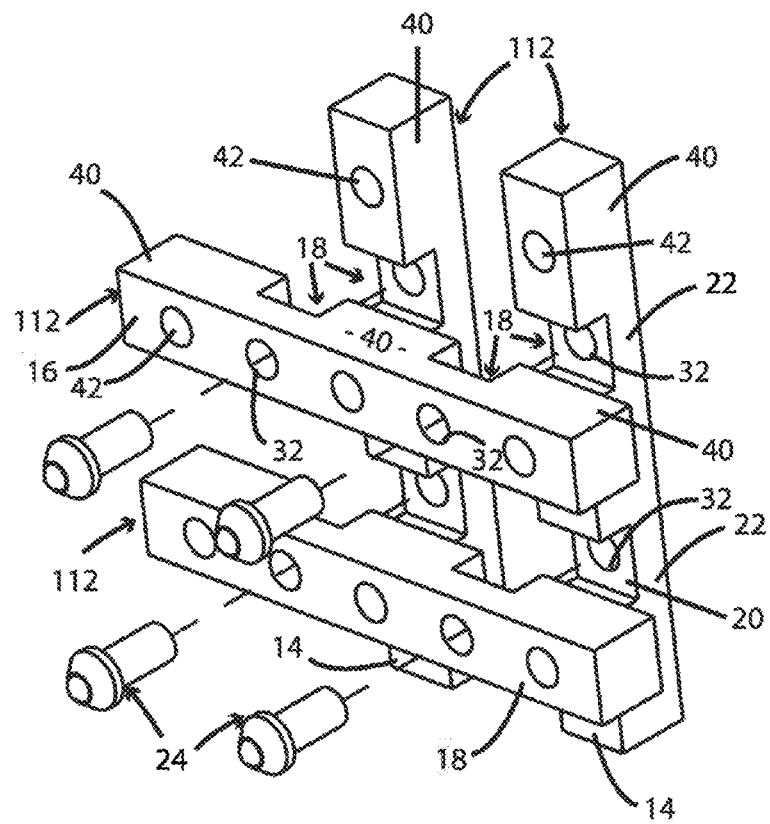
FIG. 9 is a bottom perspective view in exploded form of a plurality of dolly members as represented in FIGS. 7 and 8 in a preassembled orientation, including supporting castors being attached thereto.

In addition, each of the plurality of dolly members 112 include a plurality of supporting segments 40, each of which include a channel 42 extending completely therethrough such that opposite, open ends of the channel 42 are coincident with the oppositely disposed outer faces 14 and 16. As should be apparent, the structural differences between the dolly member 112, as represented in FIGS. 7 and 8 and the dolly member 12, as represented in FIGS. 1 and 2, are a lesser number of both connecting segments 18 and supporting segments 40. As such, the dolly member 112 may or may not be somewhat shorter in length, while still being capable of interconnection with other dolly members 12 or 112 to form a number of different supporting orientations, as represented in FIGS. 9 through 12.

Figure 22:
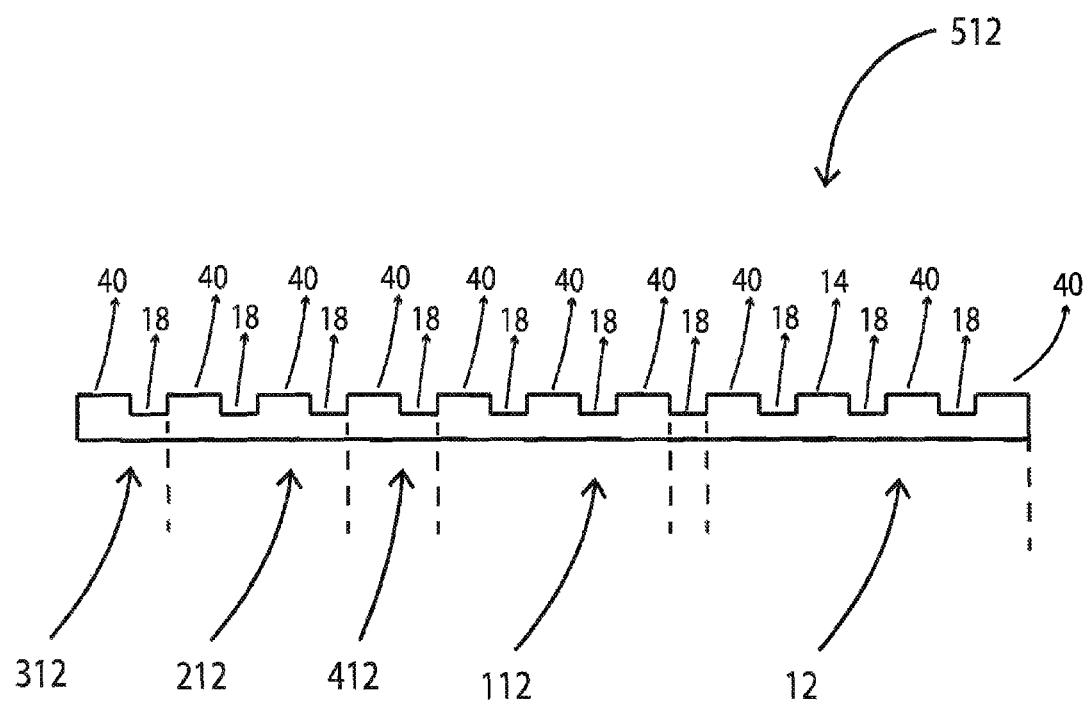
FIG. 22 is a side view in partial cutaway of an elongated, severable material dolly member of sufficient length to facilitate a plurality of other dolly members being formed therefrom by being severed from the length thereof.

As set forth above and as explained in greater detail hereinafter relative to FIG. 22, the material from which at least some of the plurality of dolly members of the various dolly assemblies may be formed may be lightweight, disposable and in some embodiments a severable material such as, but not limited to, cardboard. Also, the above categories of disposable material, as well as others not specifically mentioned, from which at least some of the dolly members are formed, may also be recyclable or environmentally friendly, thereby eliminating or significantly reducing any disadvantages associated with the disposal of relatively large numbers of the dolly members. With further regard to the severability feature of at least some of the dolly members, the shorter dolly members 112 may in fact be formed from the somewhat longer dolly members including, but not limited to, by severing a portion of the length of a longer dolly member 12 to form one or more shorter dolly members 312 and/or 112.

Moreover, the severability of the material from which the dolly members of the present invention are formed allows for the severing, separation or disconnection to be accomplished using any common or conventionally structured tool such as a saw or other cutting or separating device. Further the severable nature of the material of at least some of one or more dolly members 12, 112, 212, etc. allows the consumer to purchase or obtain such dolly members in comparatively long lengths, as represented and described in FIG. 22, rather than a plurality of individual pre-cut dolly members. When made available in longer lengths, as represented by the dolly member 512 in FIG. 22, the individual dolly members 12, 112, 212 etc. may be formed by the user or consumer by cutting predetermined lengths as desired to form a dolly assembly 10, 110, etc. having a preferred supporting orientation such as described above and represented throughout the other Figures.

Figure 10:
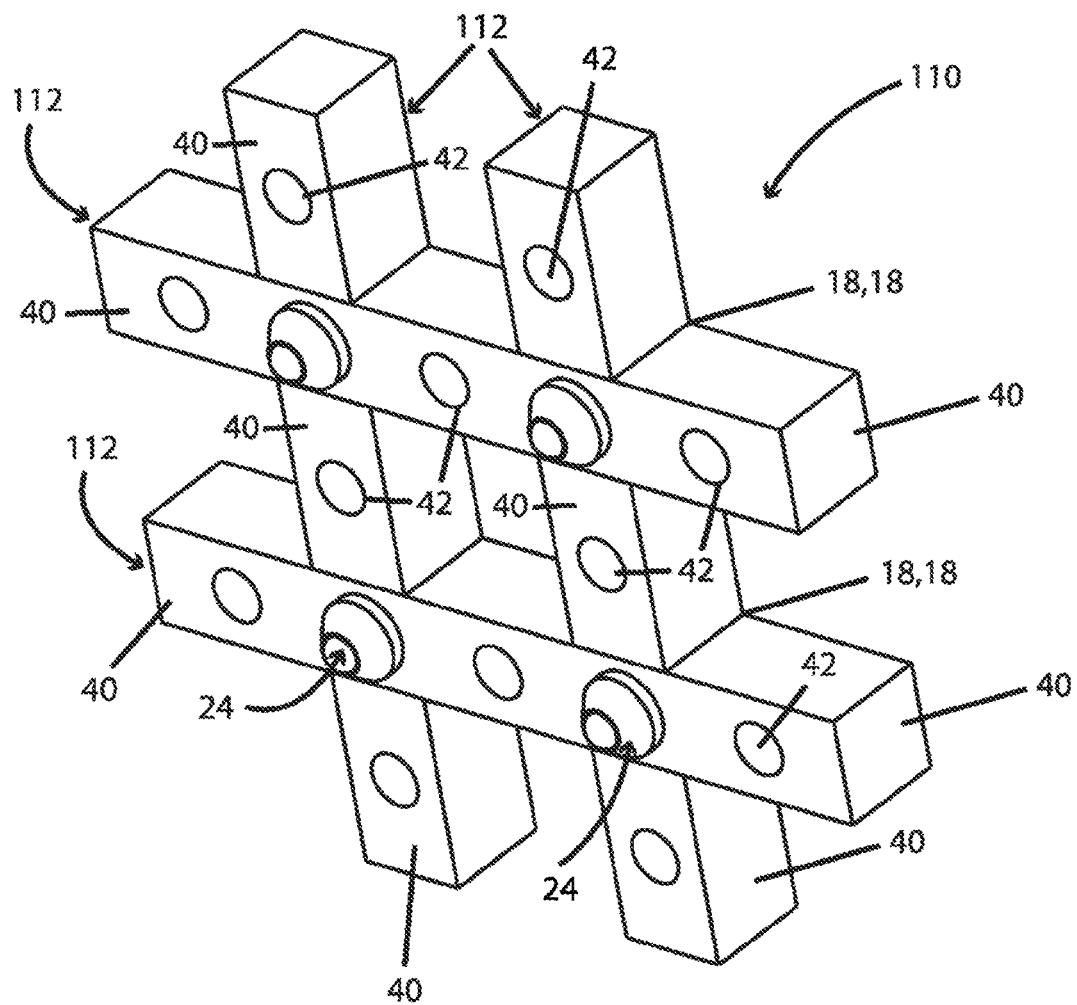
FIG. 10 is a bottom perspective view of the embodiment of FIG. 9 in an assembled form.
Figure 13:
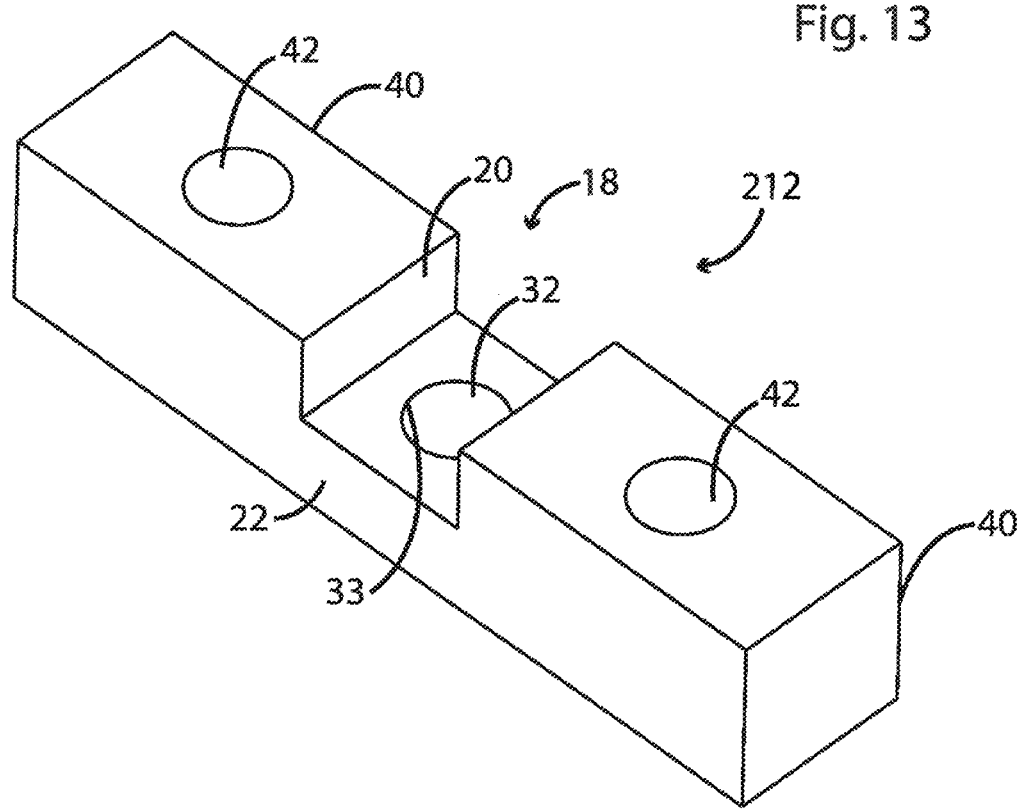
FIG. 13 is a top perspective view of yet another preferred embodiment of one of a plurality of dolly members which, when assembled, forms a dolly assembly into a different one of a plurality of possible supporting orientations.
Figure 14:
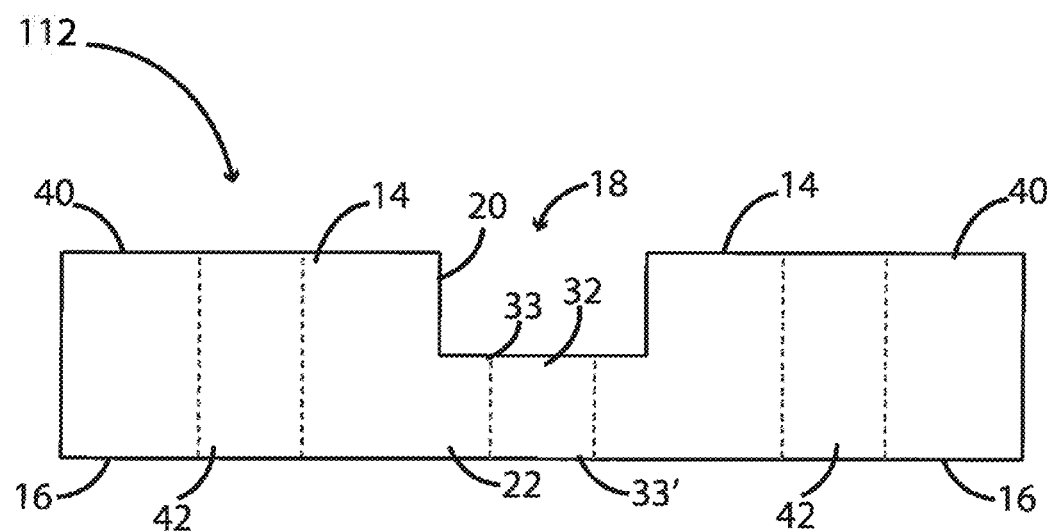
FIG. 14 is a side view of the embodiment of FIG. 13 in partial phantom.

As represented in the various supporting orientations of FIGS. 9 through 12, any two of the dolly members 112 may be disposed in a connected orientation comprising a confronting relation of bases 22 of engaging connecting segments 18, 18 and a communicating, coaxial relation of the apertures 32 of each of the confronting bases 22. When in any of the intended supporting orientations, the dolly assembly 110 is formed through assembly of the interconnected dolly members 112. In addition, the plurality of castors 24 may be appropriately positioned into either engaging connecting segments 18, 18 of interconnected dollies 112, as represented in FIG. 10, as well as supporting segments 40, as represented in FIG. 12.

With reference now to FIGS. 13 through 16, yet another preferred embodiment of the dolly assembly is generally represented as 210 and is formed from interconnecting dolly members 212. Similar to the embodiment of the dolly members 12 and 112 in FIGS. 1, 2 and 7, 8, respectively, each of the plurality of dolly members 212 includes an elongated configuration, albeit shorter than the dolly members 12 and 112. As set forth above, each of the dolly members 12, 112 and 212 may be formed from a disposable, lightweight and/or severable material thereby facilitating the formation of the dolly members 212 by cutting sections from a dolly member 12 or 112 or other dolly members having even greater lengths.

In addition, each of the plurality of dolly members 212 includes at least one connecting section 18 having an open slot 20 terminating in a corresponding base 22. The base 22 includes an aperture or passage 32 extending through the base 22 and having oppositely disposed open ends 33 and 33'. As with the other preferred embodiments of the dolly members 12, 112, etc., the open ends 33 and 33' of the passage 32 of the base 22 are respectively disposed in open communication with the corresponding slot 20 and in coincident relation with the second outer face 16.

As also represented, each of the plurality of dolly members 212 includes at least one, but preferably a plurality of at least two, supporting segments 40 disposed preferably adjacent different opposite ends of the dolly member 212. Further, each of the supporting segments 40 includes an open ended channel 42. As also indicated, the dimension and configuration of the channels 42 as well as the passages 32 are such that the connecting stems or portions 26 of the castors 24 may be frictionally and/or press-fit into a stable but removable retention therein. Moreover, the structural and operative features of each of the plurality of dolly members 212 facilitates a connected orientation between engaging ones of the connecting segments 18,18 of interconnected dolly members 212. More specifically, the bases 22 are disposed in confronting relation to one another and the apertures 32, of engaging connecting segments 18, are disposed in coaxial relation to one another, so as to concurrently receive a connecting portion 26 of one of the castors 24 therein.

Figure 16:
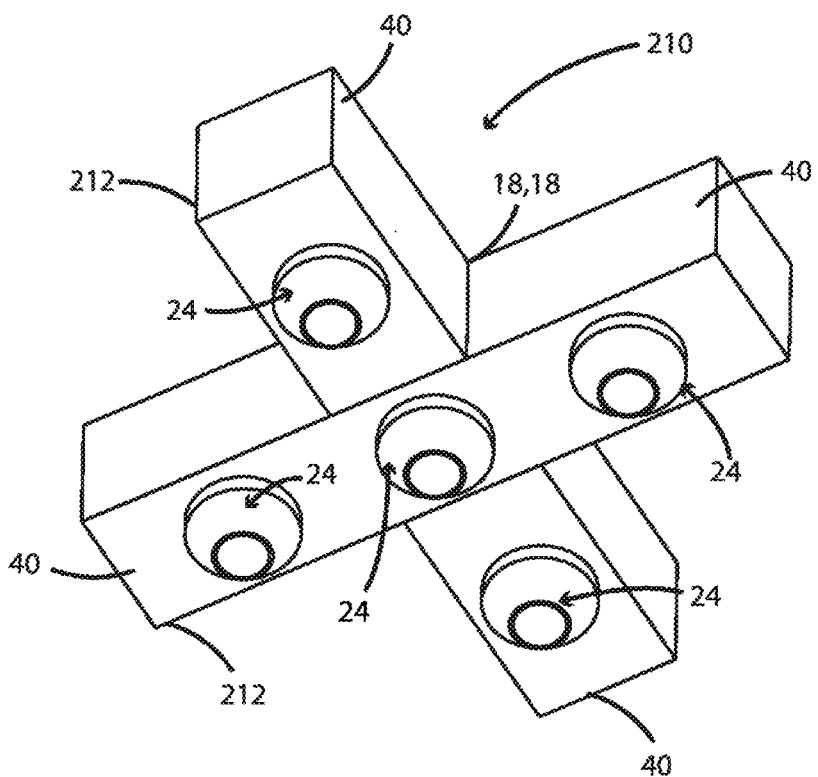
FIG. 16 is a bottom perspective view of the embodiment of FIG. 15 in an assembled orientation.
Figure 15:
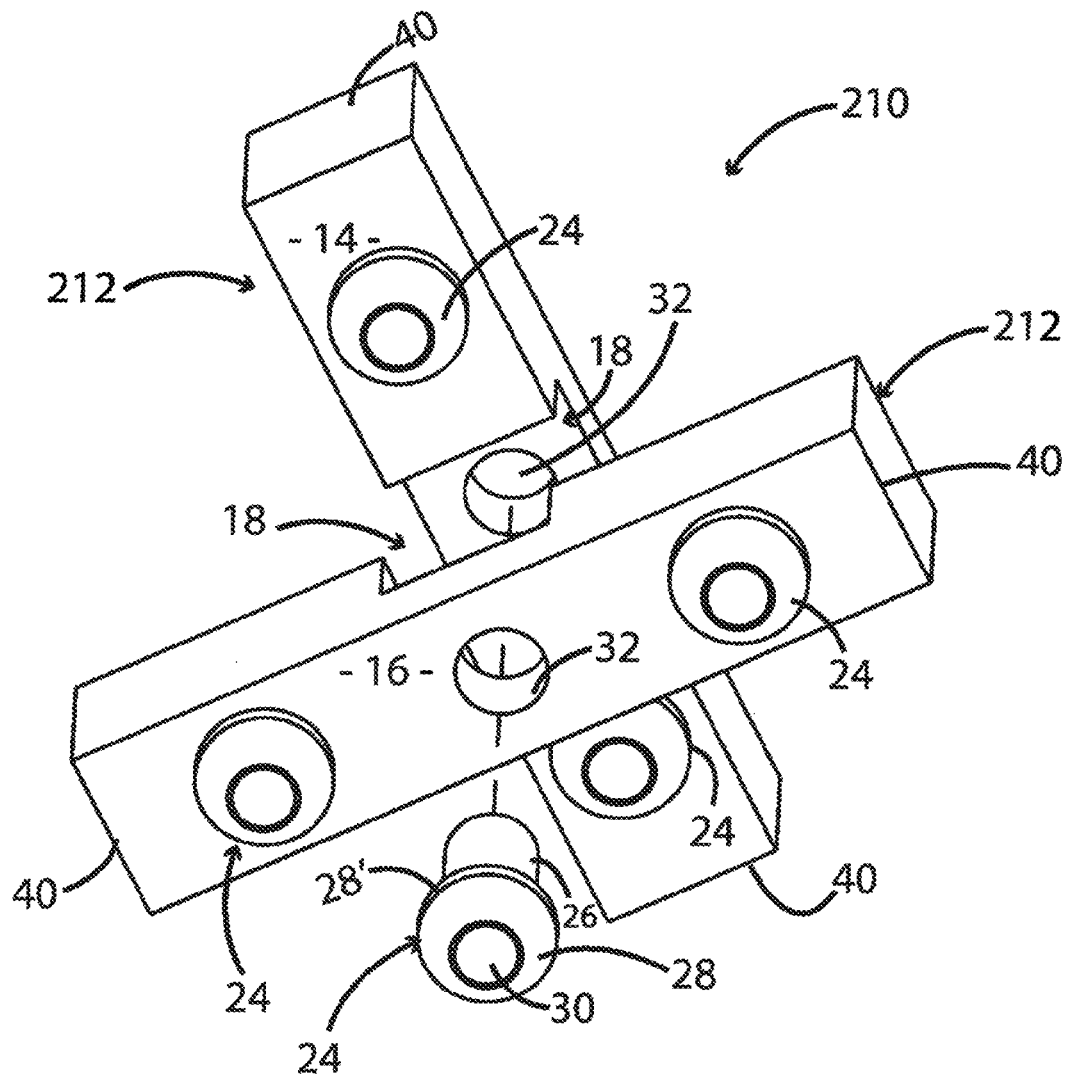
FIG. 15 is a bottom perspective view in exploded form of a dolly assembly incorporating a plurality of dolly members as represented in the embodiment of FIGS. 13 and 14 in a preassembled orientation.
Figure 17:
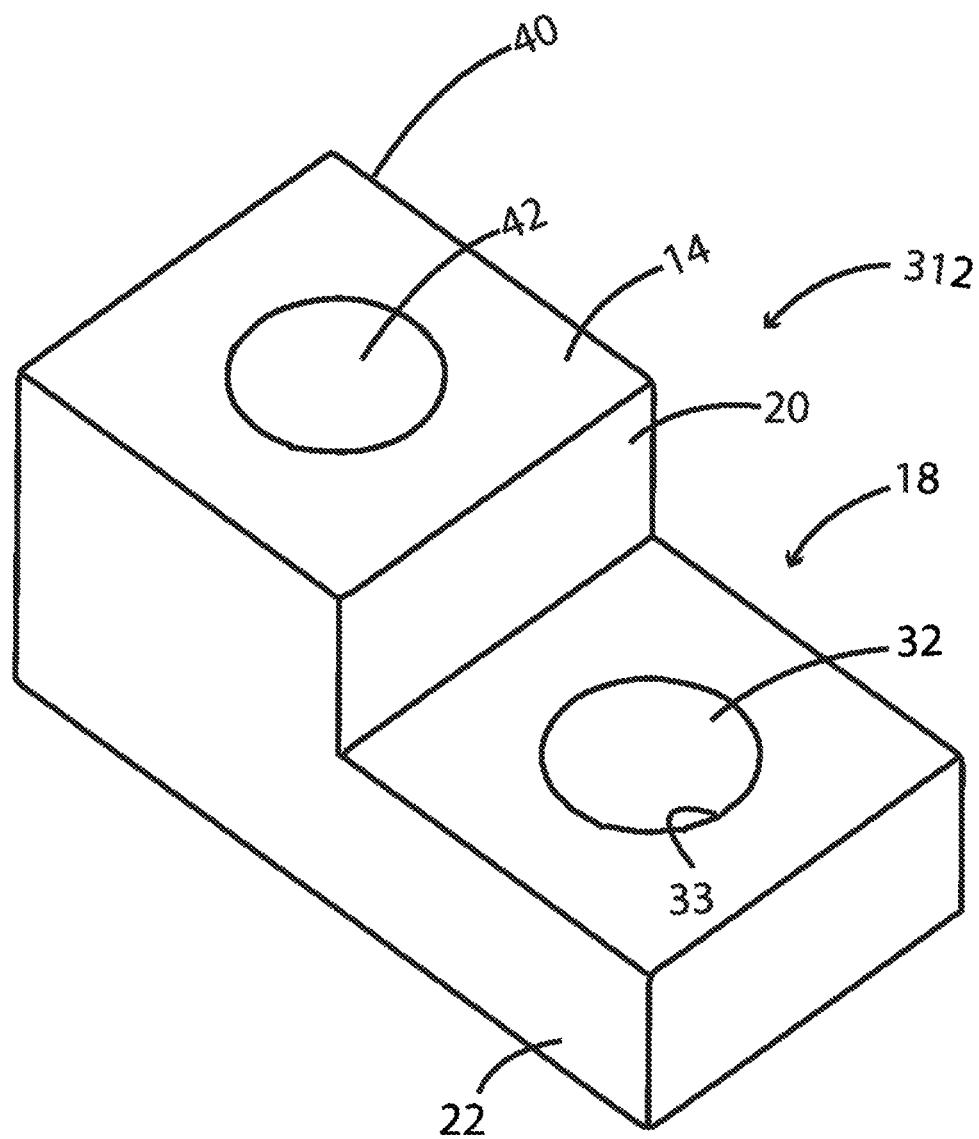
FIG. 17 is yet another preferred embodiment of one of a plurality of dolly members which, when assembled, forms a dolly assembly into a yet another different supporting orientation.

As represented in FIGS. 15 and 16, one of a possible plurality of supporting orientations of the dolly assembly 210 includes a substantially cross-frame configuration. As such, the connecting segments 18, 18 are disposed into the aforementioned connected orientation and a single castor 24 passes through coaxially aligned passages 32 associated with the bases 22 of engaging connecting sections 18,18. It is also of note that in this embodiment each of a plurality of castors 24 are removably retained in an operative, supporting position within the apertures 42 of each of the plurality of supporting segments 40 of each of the connected dolly members 212.

With primary reference now to FIGS. 17 through 21, yet another preferred embodiment of the dolly assembly is generally indicated as 310. Moreover, the dolly assembly 310 is formed by interconnecting dolly members 312 each of which has an elongated configuration comprising oppositely disposed outer faces 14 and 16. Distinguishing physical features of the dolly member 312 from the other preferred embodiments of the dolly members 12, 112, 212, etc. is a relatively shorter length comprising one connecting segment 18 and one adjacent or contiguously disposed supporting segment 40.

As set forth above when the dolly members are formed of a lightweight, disposable and/or severable material the dolly member 312 can be formed by severing, cutting, or otherwise removing or separating, correspondingly configured and dimensioned segments from the larger dolly members 12, 112, 212. However, as described in greater detail hereinafter with primary reference to FIG. 22, dolly member 312, as well as the other dolly members described herein, may be formed by being severed, etc. from an elongated dolly member 512, which may be made commercially available in much greater lengths than the typically shorter "precut" dolly members.

In the alternative, the dolly member 312 may be individually formed and may be available to the consumer in different, pre-packaged numbers. Similar structural features include each of the one or more connecting segments 18 including a slot 20 extending inwardly from the outer face 14 into a terminal portion coinciding with the inner surface of the base 22. As also noted, the slot 20 may have a two sided configuration in contrast to the three sided configuration of the connecting segments 18 formed in the dolly members 12, 112, 212, etc. Also, the base 22 of the connecting segment 18 includes a passage 32 having opposite open ends 33 and 33'. Open end 33' is coincident with the second outer face 16 and the open end 33 is disposed in open communication with the interior of the slot 20. Similar to the other dolly members, the supporting segments 40 includes a through channel 42 having opposite open ends being coincident with the first and second outer faces 14 and 16 respectively as represented herein and described above.

Figure 18:
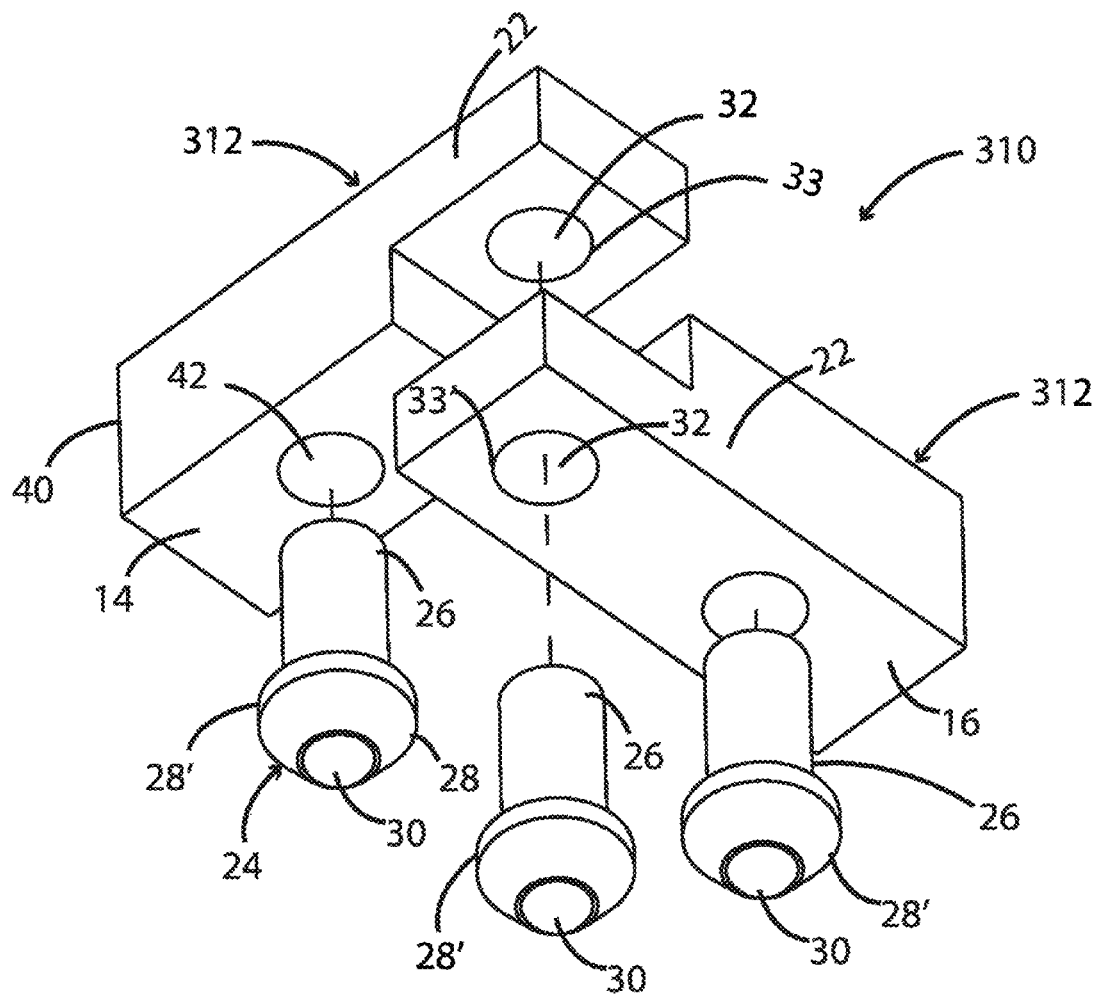
FIG. 18 is a bottom perspective view in exploded form of a dolly assembly comprised of the dolly members of the embodiment of FIG. 15 in a preassembled orientation.
Figure 19:
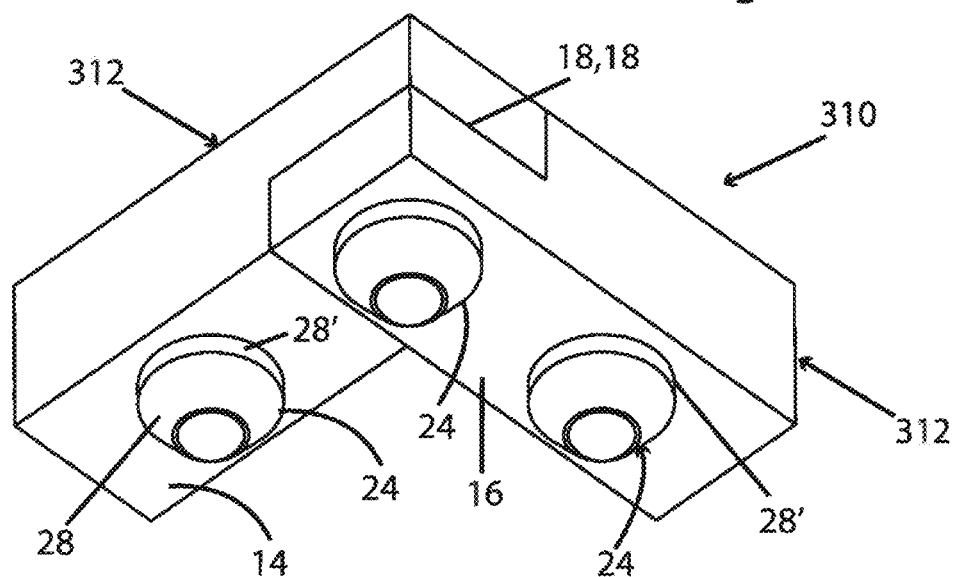
FIG. 19 is a bottom perspective view of the embodiment of FIG. 18 in an assembled orientation.
Figure 20:
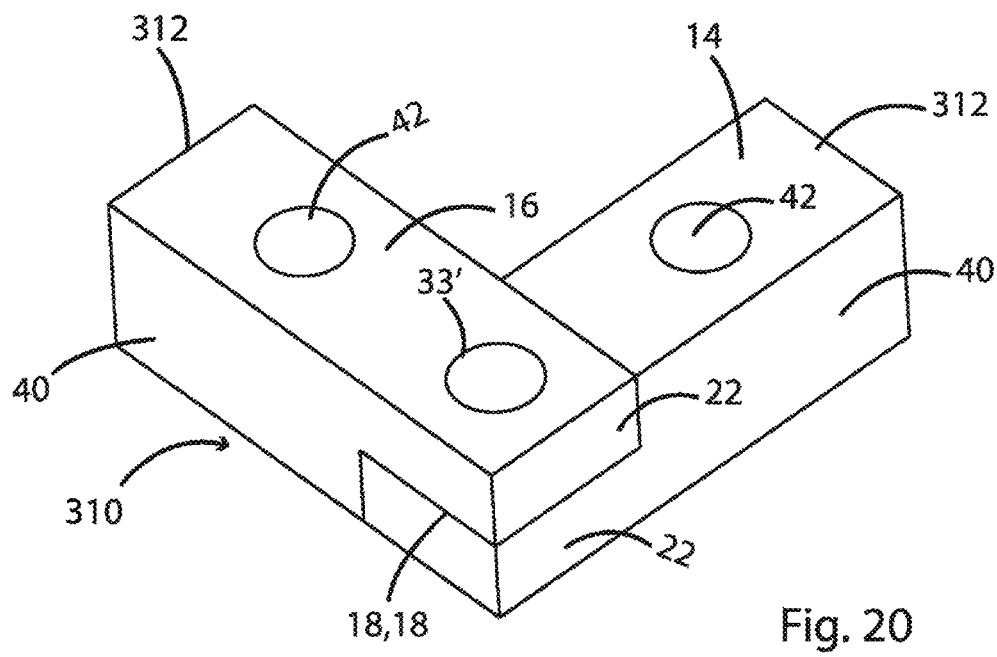
FIG. 20 is a top perspective view of the embodiment of FIGS. 18 and 19.

Further, cooperative dimensioning of the passage 33 and channel 42 with that of the connecting stem 26 of each castor 24 is such as to facilitate the frictional, press fit retention of the connecting stem within either of the passage 33 or channel 42 so as to facilitate an interlocking connection of confronting bases 22 of engaging connecting segments 18, 18 as clearly represented in FIG. 18. Such a press fit engagement also facilitates the simple and easy "manual" interconnection of any of the dolly members described herein without the use of tools. As a result, the assembly of any of the dolly assemblies formed by the interconnected dolly members does not require the use of tools and or connectors, as is common on known dolly structures. In addition and as set forth above, at least a portion of the body 28 is at least partially larger such as, but not limited to, a larger transverse dimension of peripheral portion 28'. Therefore, when any one of the castors 24 are disposed in interconnecting relation with confronting bases 22, 22 or are disposed within the supporting segments 40, the larger, outwardly extending peripheral portions 28' will engage a corresponding outer surface 14 or 16 of the base 22 or supporting segment 40 of corresponding dolly member(s) 12, 112, 212, 312, etc. in at least partially supporting relation thereto. As such, the castors 24 will not be able to pass through the respective passages 33 or 42.

As with others of the preferred embodiments of the dolly members 12, 112, 212, etc. each of the connecting segments 18 may be disposed into a connecting orientation serving to interconnect any two dolly members 312. Such a connected orientation comprises confronting relation of the bases 22 of engaging connecting segments 18, 18 and a communicating, coaxial relation of the apertures or passages 32 of the confronting bases 22.

In the formation of the one or more preferred supporting orientations represented in FIGS. 18 through 21, individual castors 24 are connected to the engaging connecting segments 18 as well as to the corresponding supporting segments 40 associated with each of the interconnected dolly members 312. It is further emphasized, that the dolly assembly 310 is represented in a supporting orientation comprising the connected dolly members 312 being transversely oriented. However, at least one additional orientation may comprise the interconnected dolly members 312 being disposed in substantially linearly aligned relation and/or angularly oriented relation, as should be apparent.

Moreover, the material from which each of the plurality of dolly members may be formed may, in addition to being light weight, disposable, recyclable, etc. may also be severable. As a result, shorter dolly members may be formed from the longer dolly members by severing a portion of the longer dolly member from its original length. Such severing, separation or disconnection can be accomplished using any common or conventionally structured tool such as, but not limited to, saws, knives or other common and readily available cutting devices or instruments. The severable characteristics of the material used in forming the dolly members allows a consumer to purchase or obtain a single, comparatively long dolly member, rather than a plurality of individual pre-cut dolly members.

As set forth above, the material from which each of the plurality of dolly members of the various dolly assemblies may be formed may be lightweight, disposable and in some embodiments severable. Accordingly, the severability features of the present invention are represented in FIG. 22. More specifically, one or more of each of the plurality of dolly members 12, 112, 212, 312, etc. may in be formed from one or more especially and comparatively long dolly members 512, which may be made commercially or otherwise available to the consuming public. As such, each such elongated dolly member 512 would comprise, at least initially, integrally connected consecutively and alternatively arranged connecting segments 18 and supporting segments 40. As a result, any of the dolly members 12, 112, 212, 312, etc., or a combination thereof, may be formed by severing one or more correspondingly configured and dimensioned portion(s) of the elongated dolly member 512 from its original or remaining length.

The severability of the material from which the dolly members of the present invention are formed allows for the severing, separation or disconnection to be accomplished using any common or conventionally structured tool such as a saw, blade or other commonly available cutting, severing or separating device. Further the severable nature of the material of the dolly member(s) 512 and/or one or more of the dolly members 12, 112, 212, 312, etc., allows the consumer to purchase or otherwise obtain one or more of the elongated dolly members 512, rather than a plurality of individual pre-cut dolly members 12, 112, 212, 312, etc. It should also be noted that dolly members having different a variety of dimensions and/or configurations, such as at 412, may also be obtained by separating corresponding portions of the dolly member 512 from the original or subsequently reduced length.

With reference now to FIG. 23, there is shown a pallet assembly 600, illustrated in assembled form utilizing a plurality of dolly members 612, 613, 614 and 622, 623, 624 in accordance with the present invention, and one or more castors 650. From this drawing, it can be appreciated that the dolly members can be modified from the embodiment shown in FIG. 1 so as to include a configuration wherein the aforesaid connecting segments 618 are separated by an extended length of the recess as at intermediate portions 617 or 619. Similar to the embodiment of FIG. 1, the connecting segments 618 are still cooperatively disposed and structured on each of the dolly members to facilitate a connected orientation between at least two dolly members, as has been described previously herein. As shown in FIG. 23, this modified configuration of the dolly members 612, 612, 614 and 622, 623, 624 results in the extended recess of intermediate portions 617 and 619 forming aligned recesses or grooves, as at 640 and 645, when the dolly members are assembled, so as to effectively form a new pallet assembly. Accordingly, the forks or other lifting structure associated with a vehicle commonly known as a fork lift can be readily received and inserted into the aligned grooves 640 and 645 which effectively form passages for the forks of the forklift, inserted in the direction shown by the directional arrows, and the fork lift can then be operated so as to lift the entire pallet assembly 600, including any load carried on it, and then move it from one location to another. Once the entire pallet assembly 600 and any load carried on it are set down in a new location by the fork lift, with the forks thereof removed from the passages 640, 645, in a direction opposite to the directional arrows, further movement of the entire pallet assembly 600, including the load carried by it, can be achieved by virtue of the castors 650 included within this assembly 600. Thus, once the forks of the forklift have been removed, a person can then push the entire pallet assembly 600 and load to a nearby location or so as to better adjust it within the selected location, such as for example, where the forklift cannot readily access the same, whether that be a compact storage location, corner of a warehouse, on a ship, in a truck, etc.

Additionally, the pallet assembly 600 is structured to allow the upper pallet section 620 formed by dolly members 622, 623 and 624 to be easily separated and lifted apart from the lower pallet section 610 formed by dolly members 612, 613 and 614. More specifically, the forks of a fork lift can also be directed to enter into pallet assembly 600 in a direction that is ninety degrees to aligned grooves 640 and 645, as shown at 630 and 635, to lift and collectively separate dolly members 622, 623 and 624 forming a removable upper pallet section 620 from the lower pallet section 610, so as to move a load carried thereon, away from the lower or base pallet section 610 having the plurality of castors 650.

Referring now to FIG. 24, another pallet assembly 700 is shown having another embodiment. More specifically, the pallet assembly 700 is shown in assembled form and also utilizes a plurality of dolly members in accordance with the present invention, similar to those described above with reference to FIG. 23, but in this embodiment it is not necessary to use castors and/or castors with a rollerball or wheel. As represented in FIG. 24, there is sufficient space beneath the intermediate portions 717 and 719, which are the longer, relatively thin recessed portions on the base of each of the dolly members extending between the connecting segments 718, to allow the passage of the forks of a lift truck in the direction indicated by directional arrow 740 and 745, without the use of castors. This is accomplished by virtue of the connecting segments 718 providing in assembled form a greater "thickness" or transverse dimension than the intermediate portions 717, 719. As a result, a space of sufficient height and width is created beneath the intermediate portions 717, 719 so that when dolly members such as 712, 713, 714 and 722, 723, 724 are assembled the aligned passages as at 740 and 745 will readily receive the placement of the forks of a forklift, even when castors are removed from the structure. More in particular, when a load is carried on the pallet assembly 700, this applies a downward force, and at the same time, when the forks of a forklift are placed within aligned passages 740 and 745 underneath the pallet and lifted, this applies a lifting force from the undersurfaces of the pallet assembly 700. In any event, however, and despite the application of these forces, the connected orientation of the assembled dolly members 712, 713, 714 and 722, 723, 724 is maintained, due to the dolly members being disposed in engaging, substantially interlocking relation to one another to establish a removable but stable, press fit, frictional or other secure but removable connection there between.

Since many modifications, variations and changes in detail can be made to the various embodiments of the invention described herein, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. A dolly assembly structured to be castor supported and assume a plurality of different supporting orientations, said dolly assembly comprising:
   (a) a plurality of elongated dolly members each having oppositely disposed first and second outer faces extending along the length thereof and a plurality of castors,
   (b) each of said dolly members comprising a plurality of connecting segments extending along the length thereof,
   (c) each of said connecting segments comprising a slot and a base, said slot extending inwardly from said first outer face to said base and said base extending from said second outer face to said slot,
   (d) each of said bases including a passage extending there through and structured to allow one of said plurality of castors to be removably received within said passage; each passage having oppositely disposed open ends, each open end disposed in aligned, communicating relation with a different one of said second outer faces and a corresponding one of said slots,
   (e) a connected orientation of any two said dolly members comprising a confronting relation of said bases of engaging connecting segments and a coaxially aligned relation of said passages of said confronting bases,
   (f) said aligned passages disposed and dimensioned to concurrently retain one of said plurality of castors therein in interconnecting relation to said confronting bases,
   (g) said passages of each of said confronting bases of engaging ones of said connecting segments being disposed to receive one of said plurality of castors therein through either one of said second outer faces of said dolly members in said connected orientation, and
   (h) at least some of said dolly members including at least one supporting segment including a channel extending there through in communicating relation with corresponding ones of both said first and second outer faces; said channel cooperatively disposed and dimensioned to receive another one of said plurality of castors therein through either of said first and second outer faces.

2. A dolly assembly as recited in claim 1 wherein each of said dolly members have an identical configuration.

3. A dolly assembly as recited in claim 2 where said dolly members are reversible.

4. A pallet assembly comprising:
   (a) a plurality of elongated dolly members each having oppositely disposed first and second outer faces extending along the length thereof,
   (b) each of said dolly members comprising a plurality of the present connecting segments extending along the length thereof,
   (c) each of said connecting segments comprising a slot and a base, said slot extending inwardly from said first outer face to said base and said base extending from said second outer face to said slot,
   (d) each of said bases including an intermediate portion with an extended recess; and
   (e) a connected orientation of any two said dolly members comprising a confronting relation of said bases of engaging connecting segments and a coaxially aligned relation of said passages of said confronting bases, and
   (f) said connected orientation further comprising a plurality of said intermediate portions being aligned with one another so as to define a passage sized and configured to receive a lifting structure associated with a fork lift vehicle.

5. A pallet assembly as recited in claim 4 further comprising a plurality of castors.

6. A pallet assembly as recited in claim 4 wherein each of said dolly members have an identical configuration.

7. A pallet assembly as recited in claim 6 where said dolly members are reversible.

* * * * *